United States Patent
Mafune et al.

(10) Patent No.: US 7,195,664 B2
(45) Date of Patent: *Mar. 27, 2007

(54) INK SET, INK JET RECORDING APPARATUS, INK JET RECORDING METHOD, RECORDING UNIT, AND INK CARTRIDGE

(75) Inventors: Kumiko Mafune, Kanagawa (JP); Tsuyoshi Kanke, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/682,519

(22) Filed: Oct. 10, 2003

(65) Prior Publication Data

US 2004/0074418 A1 Apr. 22, 2004

Related U.S. Application Data

(62) Division of application No. 09/871,627, filed on Jun. 4, 2001, now Pat. No. 6,706,100.

(30) Foreign Application Priority Data

Jun. 12, 2000 (JP) ............................. 2000-176138

(51) Int. Cl.
C09D 11/02 (2006.01)
B41J 2/01 (2006.01)

(52) U.S. Cl. ................. 106/31.27; 106/31.47; 347/100

(58) Field of Classification Search ............. 106/31.27, 106/31.6, 31.47; 347/100
See application file for complete search history.

(56) References Cited

U.S. PATENT DOCUMENTS 4,446,470 A 5/1984 Sugiyama et al. ...... 346/140 R (Continued)

FOREIGN PATENT DOCUMENTS

EP 0 831 135 A1 3/1998

(Continued)

OTHER PUBLICATIONS

XP-002176757 Database WPI Section Ch, week 199026 Derwent Publications Ltd. with resp ct to JP 02-127482, of May 16, 1990.

*Primary Examiner*—Helene Klemanski
(74) *Attorney, Agent, or Firm*—Fitzpatrick, Cella, Harper & Scinto

(57) ABSTRACT

The present invention provides an ink set, an ink jet recording apparatus, an ink jet recording method, a recording unit, and an ink cartridge, which can produce ink jet color images in which the color balance does not easily become unstable even if the image is stored for a long time, and in which the color images have greater durability so that degradation of the visual appearance is not easily recognizable even if the image is stored for a long time. The ink set includes a first aqueous ink and a second aqueous ink having the same color tone, the second ink having a lower coloring material content than that of the first ink, and the degree of fading of an image produced with the second ink is the same as or lower than that of an image produced with the first ink.

42 Claims, 16 Drawing Sheets

U.S. PATENT DOCUMENTS

| | | | |
|---|---|---|---|
| 4,533,920 A | 8/1985 | Suzuki | 346/1.1 |
| 5,218,376 A | 6/1993 | Asai | 346/1.1 |
| 5,599,386 A | 2/1997 | Sano et al. | 106/22 R |
| 5,833,743 A | 11/1998 | Elwakil | 106/31.27 |
| 5,980,623 A | 11/1999 | Hiraoka et al. | 106/31.49 |
| 6,299,675 B1* | 10/2001 | Ono et al. | 106/31.27 |
| 6,454,844 B1 | 9/2002 | Kanaya | 106/31.48 |
| 6,460,988 B1 | 10/2002 | Mafune et al. | 347/100 |
| 6,540,329 B1* | 4/2003 | Kaneko et al. | 347/43 |
| 6,585,815 B2* | 7/2003 | Koitabashi et al. | 106/31.27 |
| 6,702,882 B2* | 3/2004 | Yakushigawa et al. | 106/31.27 |
| 6,706,100 B2* | 3/2004 | Mafune et al. | 106/31.27 |
| 6,706,104 B2* | 3/2004 | Takuhara et al. | 106/31.6 |
| 2002/0011178 A1* | 1/2002 | Kanke et al. | 106/31.47 |
| 2002/0018107 A1 | 2/2002 | Yakushigawa et al. | 347/100 |
| 2002/0036681 A1* | 3/2002 | Mafune et al. | 347/100 |
| 2002/0038613 A1 | 4/2002 | Yatake | 106/31.6 |
| 2002/0043177 A1* | 4/2002 | Koitabashi et al. | 106/31.27 |
| 2002/0093557 A1 | 7/2002 | Takuhara et al. | 347/100 |
| 2004/0080597 A1* | 4/2004 | Yakushigawa et al. | 347/100 |

FOREIGN PATENT DOCUMENTS

| | | |
|---|---|---|
| EP | 0 962 324 A1 | 12/1999 |
| EP | 1 063 268 A1 | 12/2000 |
| JP | 57-197191 | 12/1982 |
| JP | 59-74173 | 4/1984 |
| JP | 2-16171 | 1/1990 |
| JP | 02-127482 | 5/1990 |
| JP | 8-73791 | 3/1996 |
| JP | 2783647 | 5/1998 |
| JP | 11-209673 | 8/1999 |
| JP | 2000-169776 | 6/2000 |
| WO | WO99/46341 | 9/1999 |

* cited by examiner

7 μs LATER

INK SET, INK JET RECORDING APPARATUS, INK JET RECORDING METHOD, RECORDING UNIT, AND INK CARTRIDGE

This is a divisional application of application Ser. No. 09/871,627, filed Jun. 4, 2001 now U.S. Pat. No. 6,706,100.

BACKGROUND OF THE INVENTION

1. Field of the Invention

The present invention relates to ink sets, and more particularly, relates to an ink set that is suitable for use in ink jet recording in which an ink is ejected from an orifice in response to a recording signal in order to perform recording on a recording medium, as well as to an ink jet recording apparatus, an ink jet recording method, a recording unit, and an ink cartridge.

2. Description of the Related Art

Conventionally, aqueous inks in which dyes having various color tones are dissolved in water-soluble media are used for color recording using an ink jet recording method. It is desirable that the inks exhibit the following ink jet recording characteristics (1) to (10) at as high a degree as possible.

(1) Produces images with adequate density;
(2) Satisfactorily dries on a recording medium;
(3) Smearing of the recorded image does not occur;
(4) Running of the recorded image does not occur when in contact with water, alcohols, etc.;
(5) A recorded image with superior light-fastness is produced;
(6) Does not cause clogging at nozzles;
(7) Blurring of recorded images does not occur during continuous printing or when recording is started after a long interval;
(8) Stable when stored;
(9) Problems do not occur even if inks are brought into contact with components of the recording apparatus; and
(10) Has superior heat resistance and does not affect thermal energy generation elements.

Furthermore, as demand for color ink jet recording increases, images of higher resolution and higher quality are being required. For these purposes, color images in the broad color reproduction range are achieved by selecting coloring materials having superior color developing ability, and the dot size of images is decreased by producing small ink droplets, thereby achieving images with high resolution. Furthermore, by using two or more types of inks which have different coloring material contents but the same color tone, the inks can be selected depending on the density of the image, i.e., light color portions and deep color portions, and by controlling various ink-applying processes, it is possible to produce smoother images. Using the techniques described above, ink jet recording methods have recently been producing ink jet images of high quality, which are comparable to silver halide photographs.

However, even if ink jet images of a quality comparable to silver halide photographs are produced using the techniques described above, the color balance may become unstable depending on the environment in which the images are stored and the visual appearance of the image may degrade, resulting in a loss in durability of the images. Therefore, there is an increased demand for an ink jet image which has, in addition to high resolution, even more superior durability, for example, and which does not fade substantially even if stored for a long period of time.

SUMMARY OF THE INVENTION

Accordingly, the present invention provides an ink set which can produce a color image that is able to maintain good color balance for a long period of time in which the color balance does not easily become unstable even if stored for a long time.

The present invention also provides an ink jet recording method and an ink jet recording apparatus used therefor, which can produce color images having greater durability, i.e., degradation of the visual appearance of the image is not easily recognizable even if stored for a long time.

The present invention provides a magenta ink set capable of suppressing changes in the visual color balance due to the degradation of the magenta color in images even if stored for a long time.

The present invention also provides a recording unit and an ink cartridge which can be used very effectively for the production of ink jet color images in which image degradation due to the degradation of the magenta color in images is not easily noticeable.

According to one aspect of the present invention, there is provided an ink set comprising a first aqueous ink and a second aqueous ink having the same color tone, wherein the first and second inks contain at least one common coloring material, the second ink has a lower coloring material content than the coloring material content of the first ink, and the degree of fading of an image produced with the second ink is the same as or lower than the degree of fading of an image produced with the first ink.

According to another aspect of the present invention, there is provided an ink set comprising a first aqueous ink and a second aqueous ink having the same color tone, wherein the first and second inks contain at least one common coloring material, the second ink has a lower coloring material content than the coloring material content of the first ink, and the residual rate of the reflection density of an image produced with the second ink when it is left under a condition that promotes fading is equal to or greater than that of an image produced with the first ink.

By using the ink sets as described above, it is possible to obtain color images in which the color balance does not become substantially unstable even if the image is stored for a long time.

According to a further aspect of the present invention, there is provided an ink jet recording apparatus comprising ink storage portions storing a first aqueous ink and a second aqueous ink having a same color tone respectively, wherein the first ink and the second ink contain at least one common coloring material, the second ink has a lower coloring material content than the coloring material content of the first ink, and the degree of fading of an image produced with the second ink is the same as or lower than the degree of fading of an image produced with the first ink, and a head portion for ejecting the inks.

According to a further aspect of the present invention, there is provided an ink jet recording apparatus comprising ink storage portions storing a first aqueous ink and a second aqueous ink having a same color tone respectively, wherein the first ink and the second ink contain at least one common coloring material, the second ink has a lower coloring material content than the coloring material content of the first ink, and the residual rate of the reflection density of an image produced with the second ink when it is left under a condition that promotes fading is equal to or greater than that of an image produced with the first ink, and a head portion for ejecting the inks.

According to a further aspect of the present invention, there is provided an ink jet recording method comprising the step of applying a first aqueous ink and a second aqueous ink having the same color tone to a recording medium, wherein the first and second inks contain at least one common coloring material, the second ink has a lower coloring material content than the coloring material content of the first ink, and the degree of fading of an image produced with the second ink is the same as or lower than the degree of fading of an image produced with the first ink.

According to a further aspect of the present invention, there is provided an ink jet recording method comprising the step of applying a first aqueous ink and a second aqueous ink having the same color tone to a recording medium, wherein the first ink and the second ink contain at least one common coloring material, the second ink has a lower coloring material content than that of the first ink, and the residual rate of the reflection density of an image produced with the second ink when it is left under a condition that promotes fading is equal to or greater than the residual rate of reflection density of an image produced with the first ink when it is left under the same conditions.

By using the apparatuses and the methods as described above, it is possible to obtain ink jet color images in which the color balance does not become substantially unstable even if stored for a long time.

According to a further aspect of the present invention, there is provided an ink set comprising a first ink and a second ink having the same color tone, wherein the second ink has a lower coloring material content than the coloring material content of the first ink, the second ink is an aqueous ink containing a dye represented by the formula (I) below as a sole coloring material, and the first ink is an aqueous ink containing a dye represented by the formula (I) below and at least one of a dye represented by the formula (II) below and a dye represented by the formula (III) below, as coloring materials.

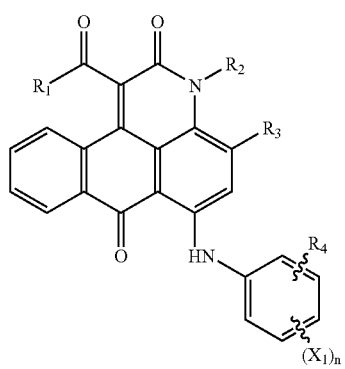

Formula (I)

In formula (I), $R_1$ is a substituted or unsubstituted alkoxy group or a substituted or unsubstituted aryl group; each of $R_2$ and $R_4$ is independently a hydrogen atom or a substituted or unsubstituted alkyl group; $R_3$ is selected from the group consisting of a hydrogen atom, a substituted or unsubstituted alkyl group, a substituted or unsubstituted alkoxy group, a substituted or unsubstituted aryloxy group, and a halogen atom; $X_1$ is a carboxyl group or a salt thereof, or a sulfonic acid group or a salt thereof; and n is 1 or 2.

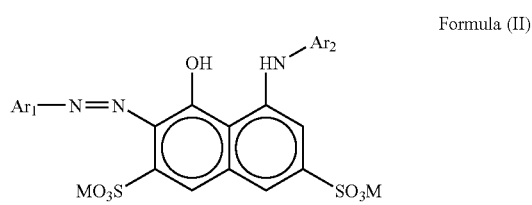

Formula (II)

In formula (II), $Ar_1$ is a substituted or unsubstituted phenyl group, or a substituted or unsubstituted naphthyl group; $Ar_2$ is selected from the group consisting of an acetyl group, a benzoyl group, a 1,3,5-triazinyl group, a $SO_2$—$C_6H_5$ group, and a $SO_2$—$C_6H_4$—$CH_3$ group; and M is selected from the group consisting of a hydrogen atom, an alkali metal, an ammonium, and an organic ammonium, M being a counter ion of the sulfonic acid group.

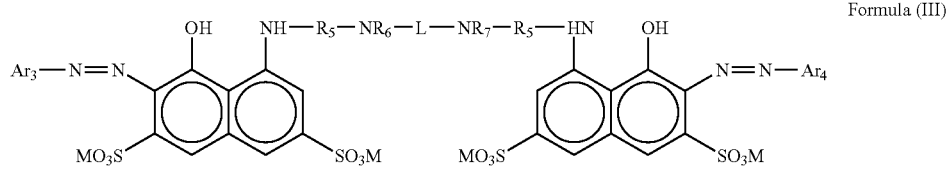

Formula (III)

In formula (III), each of $Ar_3$ and $Ar_4$ is independently a substituted or unsubstituted phenyl group, or a substituted or unsubstituted naphthyl group, at least one of $Ar_3$ and $Ar_4$ having a carboxyl group or a salt thereof, or a sulfonic acid group or a salt thereof; M is selected from the group consisting of a hydrogen atom, an alkali metal, an ammonium, and an organic ammonium, M being a counter ion of the sulfonic acid group; $R_5$ is a 1,3,5-triazinediyl group; each of $R_6$ and $R_7$ is independently selected from the group consisting of a hydrogen atom, a substituted or unsubstituted alkyl group, a substituted or unsubstituted alkenyl group, a substituted or unsubstituted aralkyl group, and an atomic group necessary to complete a perhydroxyazine ring together with N; and L is a bivalent organic connecting group.

According to a further aspect of the present invention, there is provided an ink set comprising a first ink and a second ink having the same color tone, wherein the second ink has a lower coloring material content than the coloring material content of the first ink, the second ink is an aqueous ink containing a dye represented by formula (I) as a sole coloring material, and the first ink is an aqueous ink containing a dye represented by formula (I) and at least one of C. I. Acid Red 52 and C. I. Acid Red 289.

By using the first and second inks containing the coloring materials described above, it is possible to obtain color images having superior durability in which degradation over time due to the degradation of an image with magenta inks is inhibited.

According to a further aspect of the present invention, there is provided an ink jet recording apparatus comprising ink storage portions storing a first ink and a second ink having a same color tone respectively, wherein the second ink has a lower coloring material content than the coloring material content of the first ink, the second ink is an aqueous ink containing a dye represented by formula (I) as a sole coloring material, and the first ink is an aqueous ink containing a dye represented by formula (I) and at least one of a dye represented by formula (II) and a dye represented by formula (III), as coloring materials, and a head portion for ejecting the inks.

According to a further aspect of the present invention, there is provided an ink jet recording apparatus comprising ink storage portions storing a first ink and a second ink having a same color tone respectively, wherein the second ink has a lower coloring material content than the coloring material content of the first ink, the second ink is an aqueous ink containing a dye represented by formula (I) as a sole coloring material, and the first ink is an aqueous ink containing a dye represented by formula (I) and at least one of C. I. Acid Red 52 and C. I. Acid Red 289, and a head portion for ejecting the inks.

According to a further aspect of the present invention, there is provided an ink jet recording method comprising the step of applying a first ink and a second ink having the same color tone to a recording medium, wherein the second ink has a lower coloring material content than that of the first ink, the second ink is an aqueous ink containing a dye represented by formula (I) as a sole coloring material, and the first ink is an aqueous ink containing a dye represented by formula (I) and at least one of a dye represented by formula (II) and a dye represented by formula (III), as coloring materials.

According to a further aspect of the present invention, there is provided an ink jet recording method comprising the step of applying a first ink and a second ink having the same color tone to a recording medium, wherein the second ink has a lower coloring material content than that of the first ink, the second ink is an aqueous ink containing a dye represented by formula (I) as a sole coloring material, and the first ink is an aqueous ink containing a dye represented by formula (I) and at least one of C. I. Acid Red 52 and C. I. Acid Red 289, as coloring materials.

By using the ink sets, the ink jet recording apparatuses, and the ink jet recording methods described above, it is possible to obtain ink jet color images having superior durability in which degradation of the image over time due to the degradation of an image with the magenta inks is inhibited.

According to a still further aspect of the present invention, there is provided a recording unit comprising an ink container section containing inks, and a head section for ejecting the inks, wherein the inks constitute any one of the represented ink sets used for an ink jet printer.

According to a still further aspect of the present invention, there is provided an ink cartridge comprising an ink container section containing inks, wherein the inks constitute any one of the represented ink sets.

Further objects, features and advantages of the present invention will become apparent from the following description of the preferred embodiments with reference to the attached drawings.

DESCRIPTION OF THE PREFERRED EMBODIMENTS

Figure 1:
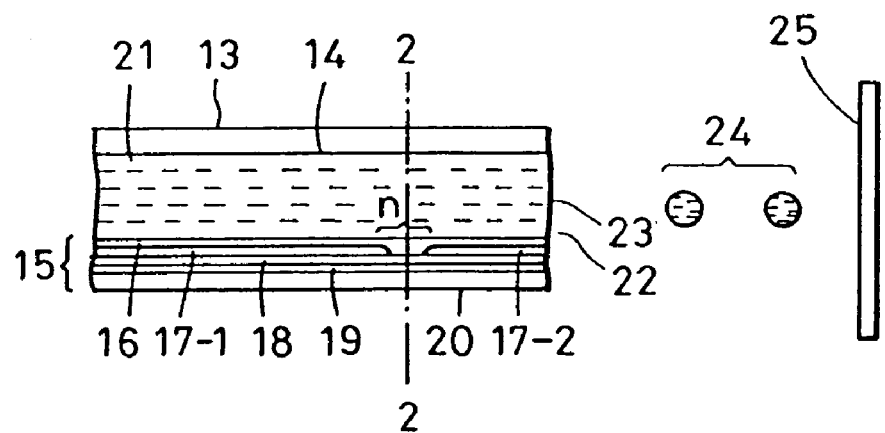
FIG. 1 is a longitudinal sectional view of a head section of an ink jet recording apparatus.

The present invention will be described in more detail with reference to the preferred embodiments.

In view of the technical background with respect to the related art described above, the present inventors have carried out research in order to produce ink jet color images having superior durability. It has been found that fading proceeds more rapidly in a light color section having a low coloring material content; namely, with respect to an image produced by two inks having the same color tone with different coloring material contents, even when coloring materials having the same light-fastness are used for both inks, in the portion of the image produced using the light color ink, fading tends to become more conspicuous than in the portion using the deep color ink. Consequently, the color balance becomes unstable in the whole image, and there tends to be significant degradation of the visual appearance of the image. This tendency is particularly noticeable in the portions of the image in which light and deep magenta inks are used.

Furthermore, when a photo-like image is formed, in order to obtain smooth gradation, the half tone portion of the image is usually formed using a large amount of light color ink. As a method for maintaining the tone continuity between the deep color portion and the light color portion, at least one common coloring material is contained in both the deep color ink and the light color ink having different coloring material contents. In contrast, the present inventors have found that in order to improve the durability of an ink jet image in such a situation, it is important to bring the durability of an image produced by the deep color ink and the durability of an image produced by the light color ink into balance. Namely, it is very important how the deep color ink and the light color ink are combined. In a photo-like ink jet image in which image degradation is particularly easily noticeable, in order to further improve the durability of the image, it is very important to discover the optimum combination of light and deep color inks. The present invention has been achieved based on such findings. In this context, fading means fading due to light.

Japanese Patent Laid-Open No. 2-127482 discloses a recording method for providing images having superior light-fastness and clarity using known inks having different coloring material contents, in which a deep magenta ink and a light magenta ink contain different dyes. However, the above-mentioned document does not describe the particular technical problems that arise when one common coloring material is contained in the deep color ink and the light color ink in view of the tone continuity between the deep color portion and the light color portion, nor does it disclose any means for solving such problems. As a result of research by the present inventors, it has been found that a magenta coloring material having an anthrapyridone skeleton represented by formula (I) exhibits light-fastness far exceeding that of the dye used for the light color ink disclosed in Japanese Patent Laid-Open No. 2-127482, and even when the magenta coloring material is used for a deep color ink, images having both superior light-fastness and clarity are provided.

Japanese Patent Laid Open Nos. 59-74173 and 2-16171, etc. disclose magenta aqueous inks containing dyes having an anthrapyridone skeleton, and describe that the dyes have superior light-fastness. Japanese Patent Laid Open Nos. 57-197191 and 2000-169776 also disclose ink jet color printing methods using magenta aqueous inks containing dyes having an anthrapyridone skeleton. However, these documents do not disclose mixing of the anthrapyridone-based magenta dyes and other magenta dyes, and moreover, do not even suggest improvement in light-fastness of images produced by inks containing a mixture of a plurality of inks. Furthermore, the documents do not describe the attempt to make higher image quality and improvement in light-fastness compatible with each other by using two or more inks having the same color tone with different image densities.

In a first embodiment of the present invention, when two inks having different coloring material contents are used for producing a color image, a first aqueous ink and a second aqueous ink are used. The first ink and the second ink have at least one common coloring material, the second ink has a lower coloring material content than that of the first ink, and the degree of fading of the second ink is the same as or lower than that of the first ink.

As described above, the present inventors have found that, with respect to an image produced by two inks having the same color tone with different coloring material contents, fading proceeds more rapidly in the light color section having a low coloring material content, and even when coloring materials having the same light-fastness are used for both inks, in the portion of the image produced using the light color ink, fading is more conspicuous. Consequently, the color balance becomes unstable in the whole image, and there tends to be significant degradation of the visual appearance of the image. Therefore, in order to inhibit this phenomenon, in the present invention, when an ink set including a first aqueous ink and a second aqueous ink having the same color tone and containing at least one common coloring material is prepared, the degree of fading of an image produced with the second ink having a low coloring material content is set to be the same as or lower than that of an image produced with the first ink having a high coloring material content.

Herein, the meaning of "the degree of fading of an image produced with the second ink is the same as or lower than that of an image produced with the first ink" is that the fading rate of the image with the second ink is the same as or lower than that of the image with the first ink.

In a second embodiment of the present invention, when two inks having different coloring material contents are used for producing a color image, a first aqueous ink and a second aqueous ink are used. The first ink and the second ink contain at least one common coloring material, the second ink has a lower coloring material content than that of the first ink, and the residual rate of the reflection density of an image produced with the second ink when left under certain predetermined conditions that promote fading is equal to or greater than the residual rate of the reflection density of an image produced with the first ink when left under such predetermined conditions. The residual rates of the reflection density of images produced with the first and second inks are preferably 80% or more.

Herein, examples of the predetermined conditions that promote fading include irradiation with a xenon lamp at approximately 6,000 klux·hr. That is, when ink images are left under such conditions, fading occurs in the ink images, and reflection densities decrease, resulting in visual image degradation. Therefore, in the present invention, when an ink set including a first aqueous ink and a second aqueous ink having the same color tone and containing at least one common coloring material is prepared, a first ink having a high coloring material content and a second ink having a low coloring material content are combined so that a decrease in the residual rate of the reflection density of an image obtained by the second ink having a relatively low coloring material content is equal to or greater than the decrease in the residual rate of the reflection density of an image obtained by the first ink having a relatively high coloring material content when left under certain conditions in which image degradation is likely to occur.

In order to satisfy such a relationship between the first and second inks, an ink set in which coloring materials in the first and second inks are appropriately selected may be used. For example, an ink set in which the first ink contains at least two coloring materials may be used. When the relevant ink set has a cyan tone, for example, as one common coloring material for the first and second inks, C. I. Direct Blue 199 may be used, and as another coloring material for the first ink, C. I. Acid Blue 9 may be used. Alternatively, C. I. Acid Blue 307 may be used as one common coloring material, and as a second coloring material for the first ink, C. I. Acid Blue 9 may be used.

When the relevant ink set has a yellow tone, for example, as one common coloring material for the first and second inks, C. I. Direct Yellow 86 may be used, and as another coloring material for the first ink, C. I. Acid Yellow 23 may be used. Alternatively, C. I. Direct Yellow 132 may be used as one common coloring material, and as another coloring material for the first ink, C. I. Acid Yellow 23 may be used.

Next, ink sets having a magenta tone will be described below.

Coloring Material

Although the coloring material which can be used for the ink set in the present invention is not particularly limited, preferred examples of the coloring materials include aqueous xanthene dyes, triphenylmethane dyes, anthraquinone dyes, monoazo dyes, disazo dyes, trisazo dyes, tetraazo dyes, and copper phthalocyanine dyes, all of which are listed in the Color Index.

Preferred examples of the coloring material commonly used for the first and second magenta inks include an anthrapyridone-based dye represented by formula (I) below.

bromine. For example, $R_2$ is a hydrogen atom, or a straight-chain or branched lower alkyl group with 1 to 4 carbon atoms, and $R_3$ is a hydrogen atom, a straight-chain or branched alkyl group with 1 to 4 carbon atoms, a straight-chain or branched alkoxy group with 1 to 4 carbon atoms, or an aryloxy group such as a phenoxy group. The aryl group constituting the aryloxy group may be, for example, replaced with a straight-chain or branched alkyl group with 1 to 10 carbon atoms, a sulfonic acid group or a salt thereof, a carboxyl group or a salt thereof, or the like. Furthermore, for example, $R_4$ is a hydrogen atom, or a straight-chain or branched lower alkyl group with 1 to 4 carbon atoms. Specific examples of $X_1$ include —COOM, —SO$_3$M, where M is a hydrogen atom, an alkali metal, such as Li and Na, an ammonium (NH$_4$), and an organic ammonium (N(R$_8$)$_4$), where $R_8$ is a methyl group, an ethyl group, or the like.

Examples of dyes which can be used for adding to the first ink together with the coloring materials described above include a xanthene dye, such as at least one dye selected from the group consisting of C. I. Acid Red 52, C. I. Acid Red 289, etc., and at least one dye selected from the dyes represented by formulae (II) and (III) below, or both. In particular, when a dye represented by formula (I), a dye represented by formula (II), and C. I. Acid Red 289 are combined as coloring materials in the first ink, the image produced with the ink has a superior magenta color tone, which is, coupled with the effect of inhibiting a change in color balance, particularly advantageous for the formation of photo-like color images.

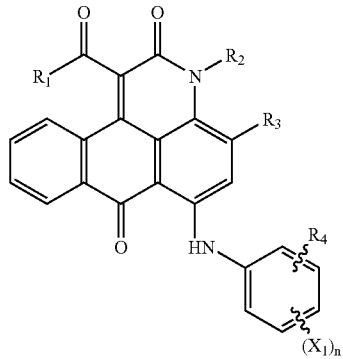

Formula (I)

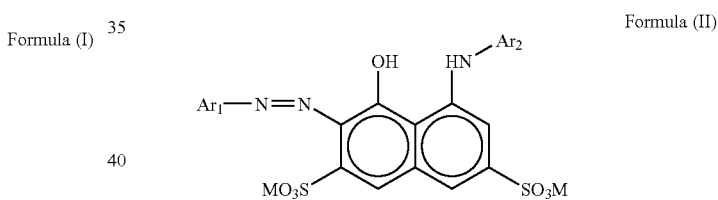

Formula (II)

In the formula (I), $R_1$ is a substituted or unsubstituted alkoxy group or a substituted or unsubstituted aryl group; each of $R_2$ and $R_4$ is independently a hydrogen atom or a substituted or unsubstituted alkyl group; $R_3$ is selected from the group consisting of a hydrogen atom, a substituted or unsubstituted alkyl group, a substituted or unsubstituted alkoxy group, a substituted or unsubstituted aryloxy group, and a halogen atom; $X_1$ is a carboxyl group or a salt thereof, or a sulfonic acid group or a salt thereof; and n is 1 or 2.

With respect to $R_1$ to $R_4$, more specifically, for example, $R_1$ is a straight-chain or branched alkoxy group with 1 to 4 carbon atoms, or a substituted or unsubstituted phenyl group. Examples of the substituted phenyl group include a methyl group, a hydroxyl group, a nitro group, a sulfonic acid group or a salt thereof, a carboxyl group or a salt thereof, and a halogen atom, such as fluorine, chlorine, or In formula II, $Ar_1$ is a substituted or unsubstituted phenyl group, or a substituted or unsubstituted naphthyl group; $Ar_2$ is selected from the group consisting of an acetyl group, a benzoyl group, a 1,3,5-triazinyl group, a SO$_2$—C$_6$H$_5$ group, and a SO$_2$—C$_6$H$_4$—CH$_3$ group; and M is selected from the group consisting of a hydrogen atom, an alkali metal such as Li and Na, an ammonium (NH$_4$), and an organic ammonium (N(R$_9$)$_4$), where $R_9$ is a methyl group, an ethyl group, or the like, M being a counter ion of the sulfonic acid group. The phenyl group or the naphthyl group of $Ar_1$ may be replaced with, for example, at least one group or atom selected from the group consisting of a carboxyl group or a salt thereof, a sulfonic acid group or a salt thereof, a straight-chain or branched alkyl group with 1 to 4 carbon atoms, a halogen atom, such as fluorine, chlorine, or bromine, an alkoxy group with 1 to 4 carbon atoms, and an aryloxy group, such as a phenoxy group. When $Ar_2$ is a benzoyl group or a 1,3,5-triazinyl group, at least one hydrogen atom in the benzene ring or the 1,3,5-triazine ring may be replaced with a carboxyl group or a salt thereof, a halogen atom, such as fluorine, chlorine, or bromine, a primary amino group, a secondary amino group, a tertiary amino group, an alkoxy group, a hydroxyl group, or the like.

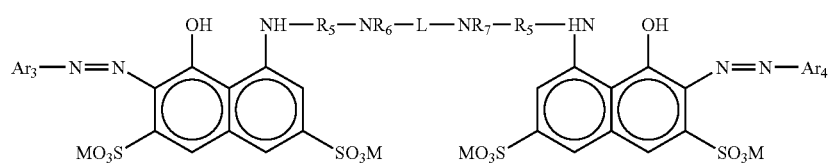

Formula (III)

In formula III, each of $Ar_3$ and $Ar_4$ is independently a substituted or unsubstituted phenyl group, or a substituted or unsubstituted naphthyl group. Examples of the substituted phenyl group and naplithyl group include a straight-chain or branched alkyl group with 1 to 4 carbon atoms, a straight-chain or branched alkoxyl group with 1 to 4 carbon atoms, a hydroxyl group, a carboxyl group or a salt thereof, a sulfonic acid group or a salt thereof, and a halogen atom, such as fluorine, chlorine, or bromine. At least one of $Ar_3$ and $Ar_4$ has a carboxyl group or a salt thereof, or a sulfonic acid group or a salt thereof. M is selected from the group consisting of a hydrogen atom, an alkali metal such as Li and Na, an ammonium ($NH_4$), and an organic ammonium ($N(R_{10})_4$), where $R_{10}$ is a methyl group, an ethyl group, or the like, M being a counter ion of the sulfonic acid group. $R_5$ is a 1,3,5-triazinediyl group, at least one hydrogen atom in the 1,3,5-triazine ring may be replaced with a carboxyl group or a salt thereof, a halogen atom, such as fluorine, chlorine, or bromine, a primary amino group, a secondary amino group, a tertiary amino group, an alkoxy group, a hydroxyl group, or the like. Each of $R_6$ and $R_7$ is independently selected from the group consisting of a hydrogen atom, a substituted or unsubstituted alkyl group, a substituted or unsubstituted alkenyl group, a substituted or unsubstituted aralkyl group, and an atomic group necessary to complete a perhydroxyazine ring together with N. L is a bivalent organic connecting group. Specific examples of $R_6$ and $R_7$ include a straight-chain or branched alkyl group with 1 to 6 carbon atoms, a straight-chain or branched alkenyl group with 1 to 4 carbon atoms, and a benzyl group. Examples of the substituents of the alkyl group, the alkenyl group, and the benzyl group include a hydroxyl group, a carboxyl group or a salt thereof, and a sulfonic acid group or a salt thereof.

As specific examples of the first coloring material represented by formula (I), which are preferably used in the present invention, illustrative compounds I-1 to I-7 are shown below. However, the present invention is not limited to these coloring materials. Two or more of these coloring materials may be used simultaneously.

Illustrative Compound I-1

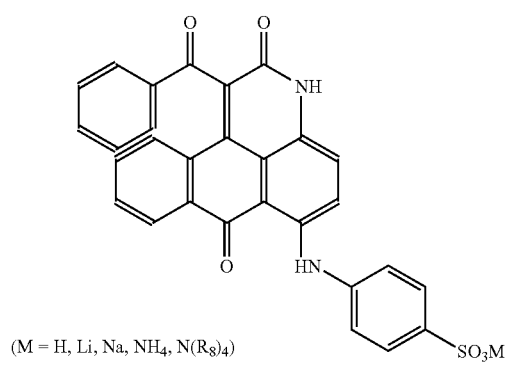

(M = H, Li, Na, $NH_4$, $N(R_8)_4$)

Illustrative Compound I-2

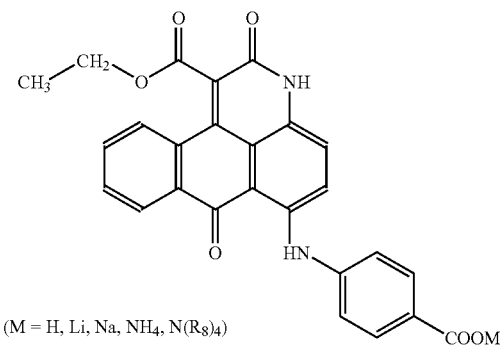

(M = H, Li, Na, $NH_4$, $N(R_8)_4$)

Illustrative Compound I-3

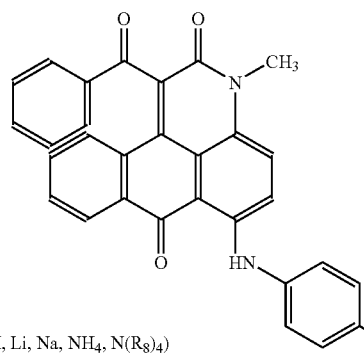

(M = H, Li, Na, $NH_4$, $N(R_8)_4$)

Illustrative Compound I-4

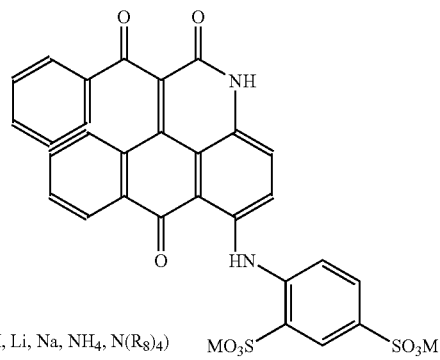

(M = H, Li, Na, $NH_4$, $N(R_8)_4$)

-continued

Illustrative Compound I-5

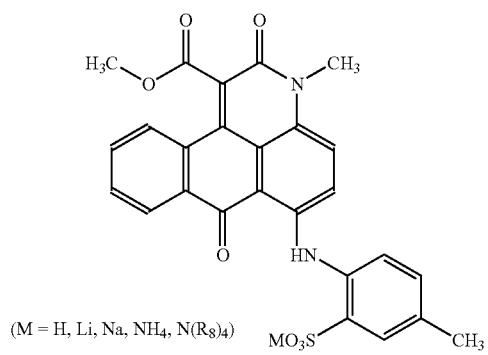

(M = H, Li, Na, NH$_4$, N(R$_8$)$_4$)

Illustrative Compound I-6

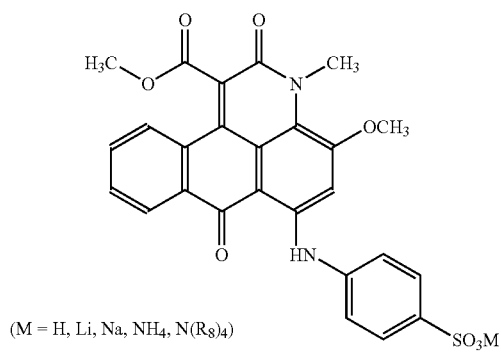

(M = H, Li, Na, NH$_4$, N(R$_8$)$_4$)

Illustrative Compound I-7

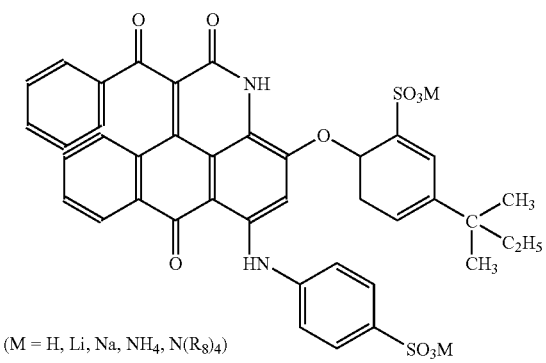

(M = H, Li, Na, NH$_4$, N(R$_8$)$_4$)

Specific examples of the compounds represented by the formula (II), which are preferably used as coloring materials in the present invention, include C. I. Reactive Red 180, illustrative compounds II-8 to II-13 of which structures are shown below, and compounds of which structures are shown in Japanese Patent Laid-Open Nos. 8-73791 and 11-209673.

Illustrative Compound II-8

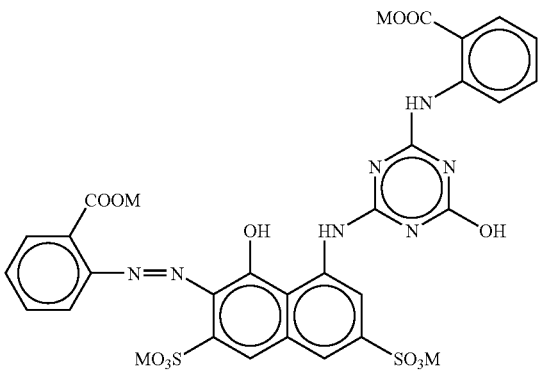

(M = H, Li, Na, NH$_4$, N(R$_9$)$_4$)

Illustrative Compound II-9

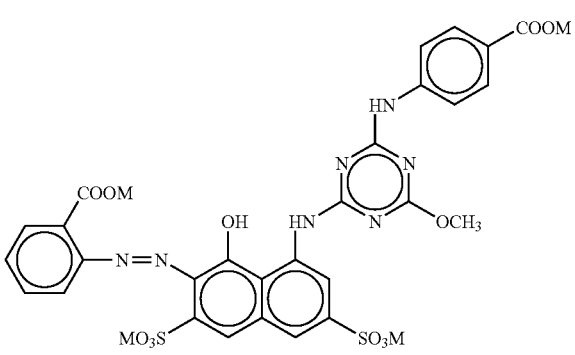

(M = H, Li, Na, NH$_4$, N(R$_9$)$_4$)

Illustrative Compound II-10

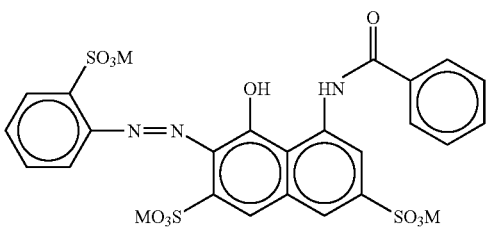

(M = H, Li, Na, NH$_4$, N(R$_9$)$_4$)

Illustrative Compound II-11

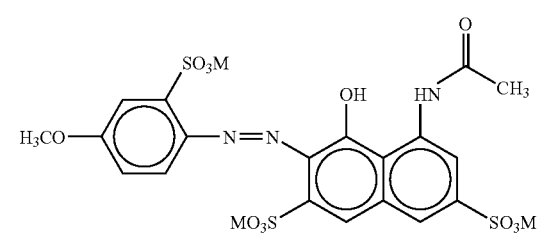

(M = H, Li, Na, NH$_4$, N(R$_9$)$_4$)

-continued

Illustrative Compound II-12

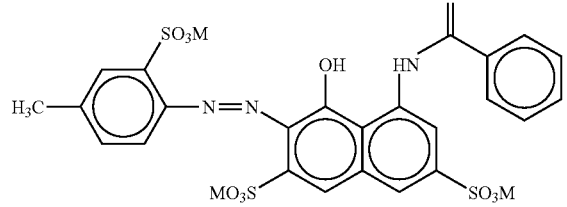

(M = H, Li, Na, NH$_4$, N(R$_9$)$_4$)

Illustrative Compound II-13 (C.I. Acid Red 249)

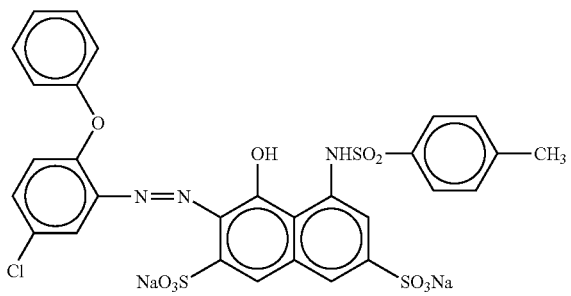

Examples of the compounds represented by formula (III), which are preferably used as coloring materials in the present invention, include illustrative compounds III-14 to III-22, of which the structures are shown below.

Illustrative Compound III-14

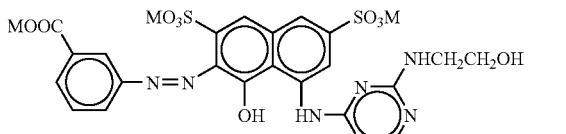

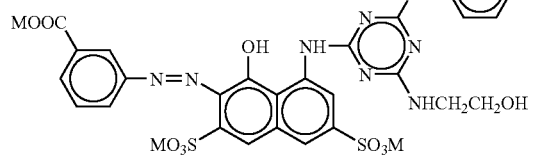

(M = H, Li, Na, NH$_4$, N(R$_{10}$)$_4$)

-continued

Illustrative Compound III-15

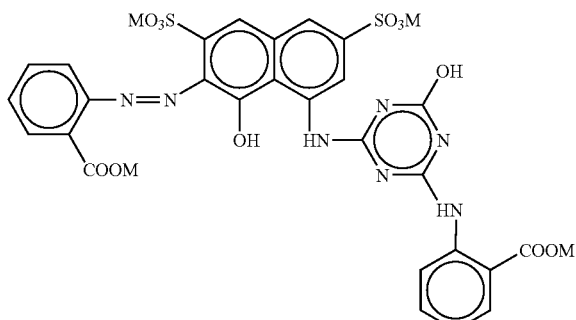

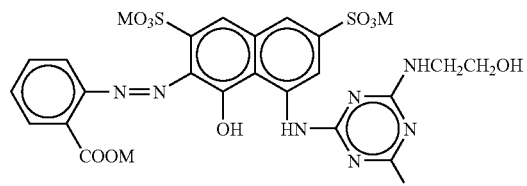

(M = H, Li, Na, NH$_4$, N(R$_{10}$)$_4$)

Illustrative Compound III-16

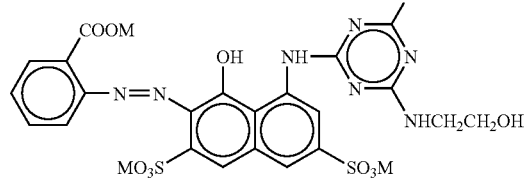

(M = H, Li, Na, NH$_4$, N(R$_{10}$)$_4$)

-continued
Illustrative Compound III-17
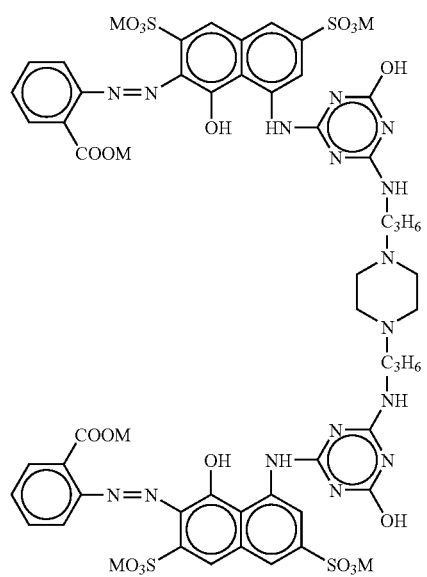
(M = H, Li, Na, NH₄, N(R₁₀)₄)
Illustrative Compound III-18
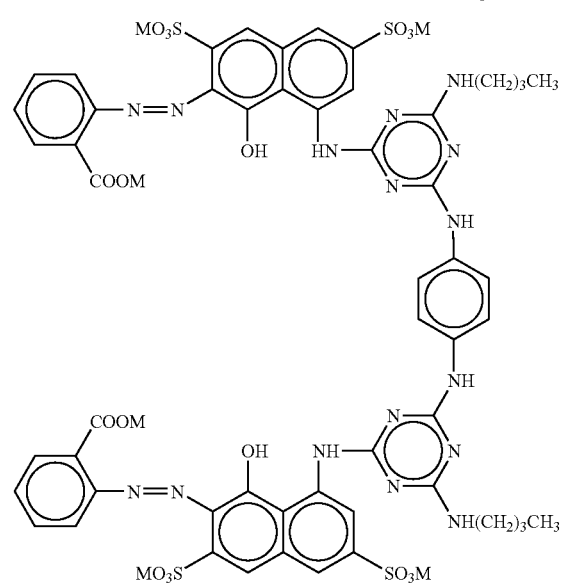
(M = H, Li, Na, NH₄, N(R₁₀)₄)
-continued
Illustrative Compound III-19
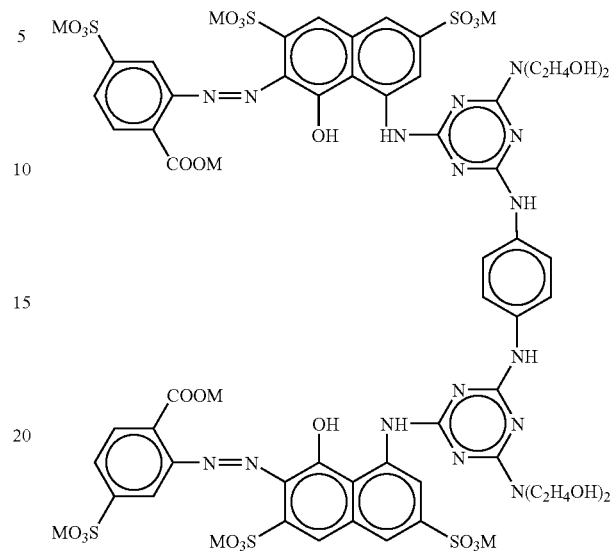
(M = H, Li, Na, NH₄, N(R₁₀)₄)
Illustrative Compound III-20
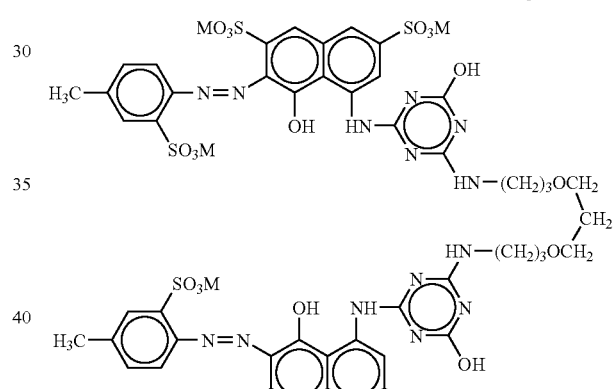
(M = H, Li, Na, NH₄, N(R₁₀)₄)
Illustrative Compound III-21
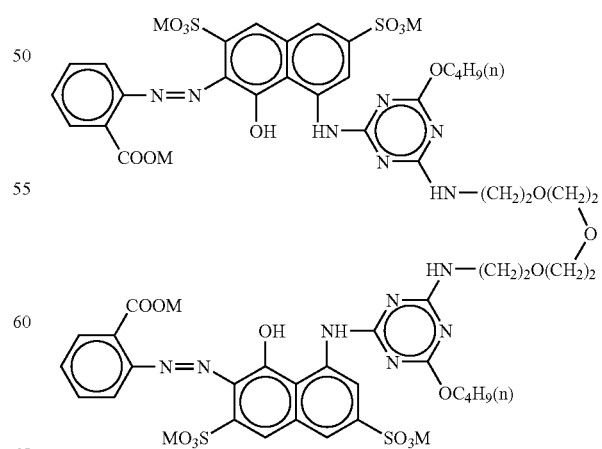
(M = H, Li, Na, NH₄, N(R₁₀)₄)

-continued

Illustrative Compound III-22

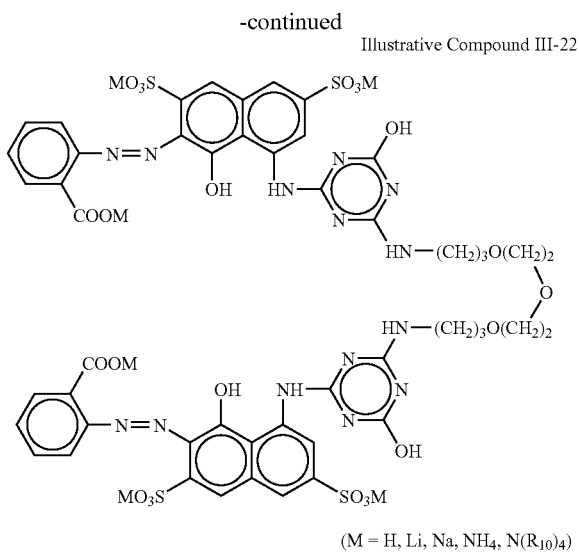

(M = H, Li, Na, NH$_4$, N(R$_{10}$)$_4$)

In the first magenta ink, the weight ratio of the coloring material represented by formula (1) to the rest of the coloring material is preferably set in the range of 95:5 to 20:80 in consideration of the advantage that clear tones, high image densities, and superior light-fastness are obtained.

Additionally, with respect to the individual inks used in the present invention, regardless of the color tones of the inks, in the deep color ink of the first ink having a high coloring material content, the total content of all coloring materials in the ink is preferably 1.0% to 15.0% by weight of the total amount of the first ink, and in the light color ink of the second ink having a low coloring material content, the total content of all coloring materials in the ink is preferably 0.1% to 5.0% by weight of the total amount of the second ink.

Aqueous Medium

The individual inks used in the present invention are aqueous inks containing the coloring materials as described above and aqueous media, which may contain a water-soluble organic solvent. The water-soluble organic solvent contained in the aqueous medium used is not particularly limited. Examples of the water-soluble organic solvent include alcohols, polyhydric alcohols, polyglycols, glycol ethers, polar solvents containing nitrogen, and polar solvents containing sulfur. The content of these water-soluble solvents in the ink is preferably 1% to 40% by weight of the total amount of ink, and more preferably, 3% to 30% by weight, in consideration of maintenance of moisture in the ink, improvement in the solubility of the coloring materials, effective permeation of the ink into the recording paper, etc. The content of water in the ink is preferably 30% to 95% by weight so that satisfactory solubility of the dyes as coloring materials in the ink is exhibited, sufficient viscosity of the ink for stable ink ejection is exhibited, and clogging does not occur at nozzles.

pH

The pH of each ink used in the present invention is not particularly limited, as long as the solubility of the coloring materials is satisfied. However, in view of safety, etc., the preferred pH is in the range of 4.0 to 11.0.

Additives

When the individual inks used in the present invention are prepared, in order to maintain moisture in the ink, moisture-maintaining constituents, such as urea, urea derivatives, and trimethylolpropane, may be used as ink constituents. The content of such moisture-maintaining constituents in the ink is preferably 0.1% to 20.0% by weight of the total amount of the ink, and more preferably, 3.0% to 10.0% by weight. Furthermore, the individual inks used in the present invention may further contain, as necessary, other various additives, such as surfactants, pH regulators, rust preventives, preservatives, mildew-proofing agents, antioxidants, anti-reducing agents, evaporation accelerators, chelating agents, and water-soluble polymers.

The inks used for the ink sets in the embodiments of the present invention are particularly suitable for an ink jet recording method in which recording is performed by the ejection of liquid droplets by the action of thermal energy. Of course, the inks may also be used for other types of ink jet recording methods and for general writing implements.

Recording Apparatus, Ink Cartridge, and Recording Unit

As a suitable recording apparatus for performing recording using the ink set of the present invention, an ink jet recording apparatus of the present invention may be mentioned, in which thermal energy in response to recording signals is applied to inks stored in chambers of a recording head, and liquid droplets are generated.

Figure 2:
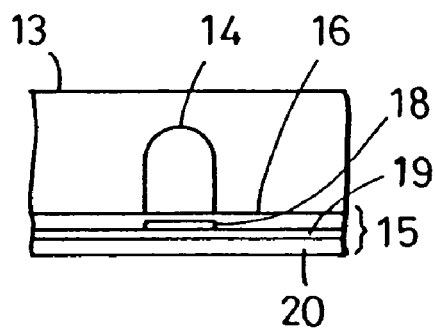
FIG. 2 is a cross-sectional view taken along line 2—2 of FIG. 1.
Figure 3:
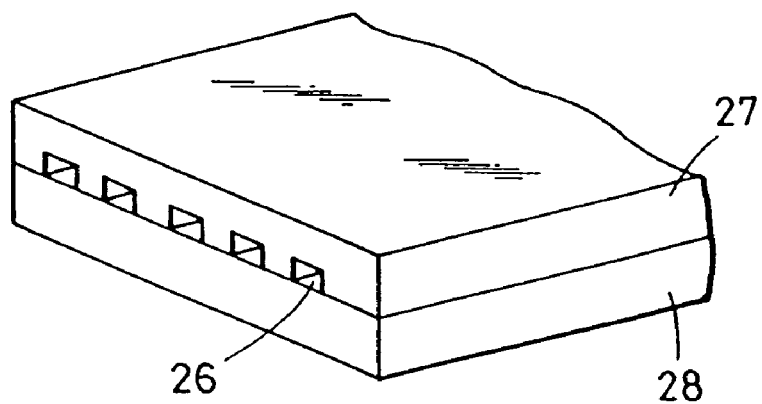
FIG. 3 is a perspective view of a head section of an ink jet recording apparatus.

FIGS. 1 to 3 show structural examples of recording heads.

A head 13 includes a plate composed of glass, ceramic, or plastic provided with an ink passage 14, and a heat generation head 15 bonded thereto. The heat generation head 15 includes a protective film 16 composed of a silicon oxide or the like, aluminum electrodes 17-1 and 17-2, heat generation resistor layer 18 composed of nichrome or the like, a heat accumulation layer 19, and a substrate 20 composed of a material with satisfactory heat dissipation, such as alumina. An ink 21 is filled up to an ink ejection orifice (fine port) 22, and a meniscus 23 is formed due to pressure. When an electrical signal is applied to the electrodes 17-1 and 17-2, an area n rapidly generates heat, creating bubbles in the ink 21 in contact with the area n. The meniscus 23 is discharged through the orifice 22 to form recording liquid droplets 24, which are ejected toward a recording medium 25. FIG. 3 shows a schematic diagram of a recording head provided with multiple passages 26 in which many nozzles, each as shown in FIG. 1, are arrayed. The recording head is fabricated by bonding a glass plate 27 provided with many passages and a heat generation head 28, which is similar to that described with reference to FIG. 1, together. Additionally, FIG. 1 is a sectional view of the head 13 taken along the ink passage, and FIG. 2 is a sectional view taken along line 2—2 of FIG. 1.

Figure 4:
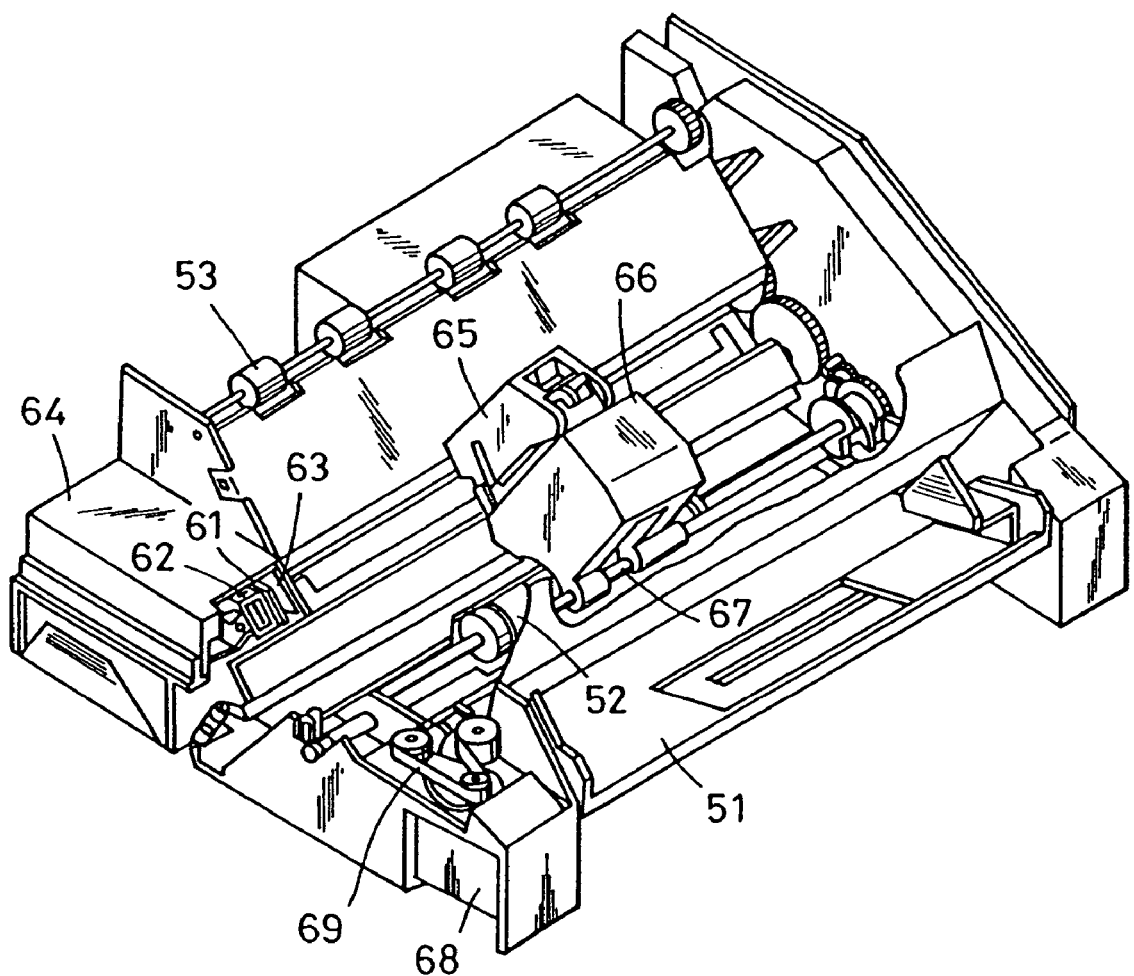
FIG. 4 is a perspective view showing an ink jet recording apparatus.

FIG. 4 is a perspective view showing an example of an ink jet recording apparatus in which a head as described above is used. A blade 61, which acts as a wiping member, has a cantilever structure in which one end is held by a blade-holding member. The blade 61 is disposed adjacent to the region recorded by the recording head, and is held so as to protrude in the moving course of the recording head. A cap 62 is disposed at the home position adjacent to the blade 61, and moves in a direction perpendicular to the moving direction of the recording head and abuts the ejection surface for performing capping. An ink absorbent 63 is held so as to protrude in the moving course of the recording head in the same manner as that of the blade 61.

The blade 61, the cap 62, and the ink absorbent 63 constitute an ejection recovery section 64, and moisture, dust, etc. on the ink ejection surface are removed by the blade 61 and the absorbent 63.

Numeral 65 represents a recording head having an ejection energy generation means for ejecting an ink to a recording medium facing the ejection surface and is provided with an ejection port. Numeral 66 represents a carriage for carrying the recording head 65. The carriage 66 is slidably engaged with a guide shaft 67, and a part of the carriage 66 is connected to a belt 69 driven by a motor 68. Thereby, the carriage 66 moves along the guide shaft 67 so that the recording head 65 moves in the recording region and its adjacent region.

Numeral 51 represents a paper feed section for inserting the recording medium, and numeral 52 represents a feed roller driven by a motor not shown in the drawing. In such a structure, the recording medium is fed to a position facing the ejection surface of the recording head 65, and as recording progresses, the recording medium is sent to the discharge section provided with discharge rollers 53.

In the structure described above, when the recording head 65 returns to the home position after recording is completed, although the cap 62 of the ejection recovery section 64 retreats from the moving path of the recording head 65, the blade 61 protrudes toward the moving path. Consequently, the ejection surface of the recording head 65 is wiped. Additionally, when the cap 62 performs capping while abutting on the ejection surface of the recording head 65, the cap 62 moves so as to protrude toward the moving path of the recording head 65.

When the recording head 65 moves from the home position to the starting position for recording, the cap 62 and the blade 61 are located at the same positions as those during wiping. Consequently, the ejection surface of the recording head 65 is also wiped when the recording head 65 moves in such a way. Additionally, while the recording head 65 moves in the recording region for performing recording, the recording head 65 moves to the home position adjacent to the recording region at predetermined intervals, and wiping is also performed during such a move.

Figure 5:
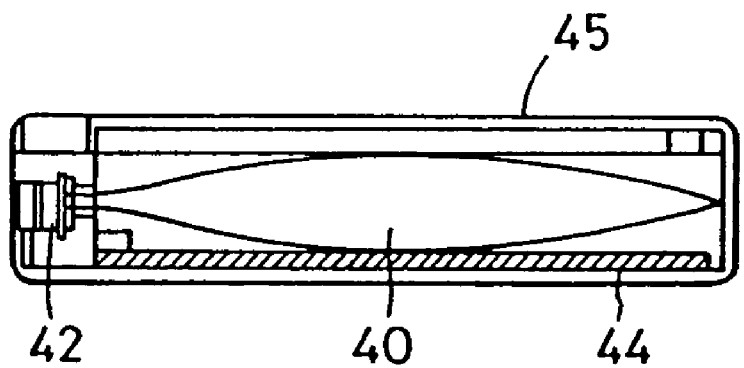
FIG. 5 is a longitudinal sectional view of an ink cartridge.

FIG. 5 is a sectional view showing an ink cartridge 45 which contains ink to be supplied to a head, for example, via a tube. The ink cartridge 45 includes an ink bag 40 as an ink container section, and a stopper 42 composed of rubber provided on the tip of the ink bag 40. The ink in the ink bag 40 can be supplied to the head by inserting a needle (not shown in the drawing) into the stopper 42. Numeral 44 represents an ink absorbent for absorbing waste ink. In the preset invention, each of the first ink and the second ink is filled in the ink container section of such an ink cartridge, and each ink cartridge is mounted on an ink jet printer provided with an ink jet recording head for ejecting the individual inks, and image formation is performed, and thereby the superior effects of the present invention are achieved.

Figure 7:
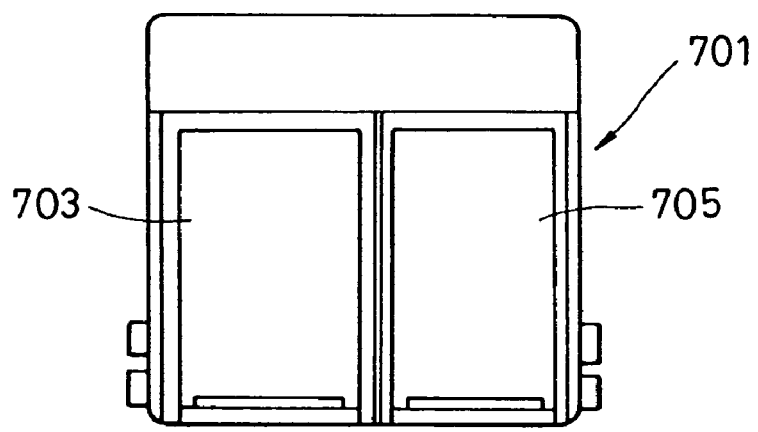
FIG. 7 is a schematic diagram showing an ink cartridge in an embodiment of the present invention.
Figure 8:
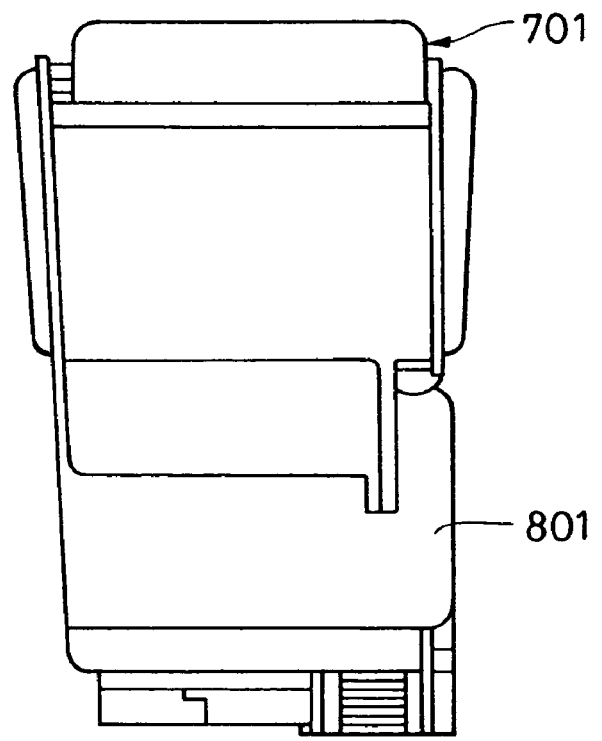
FIG. 8 is a schematic diagram showing a recording head provided with the ink cartridge shown in FIG. 7.

FIG. 7 shows an ink cartridge in another embodiment of the present invention, in which the first ink and the second ink constituting the ink set of the present invention are separately filled. A cartridge 701 includes two container sections 703 and 705 for containing the first ink and the second ink, respectively, and the cartridge 701 is detachably fitted into an ink jet head 801 for ejecting the individual inks separately, as shown in FIG. 8. When the cartridge 701 is fitted into a recording head 801, two types of ink having different coloring material contents are supplied to the recording head 801.

The ink jet recording apparatus of the present invention is not limited to the one described above in which the recording head and the ink cartridge are separately provided. An ink jet recording apparatus in which a recording head and an ink cartridge are integrated, as shown in FIG. 6, is also preferably used.

Figure 6:
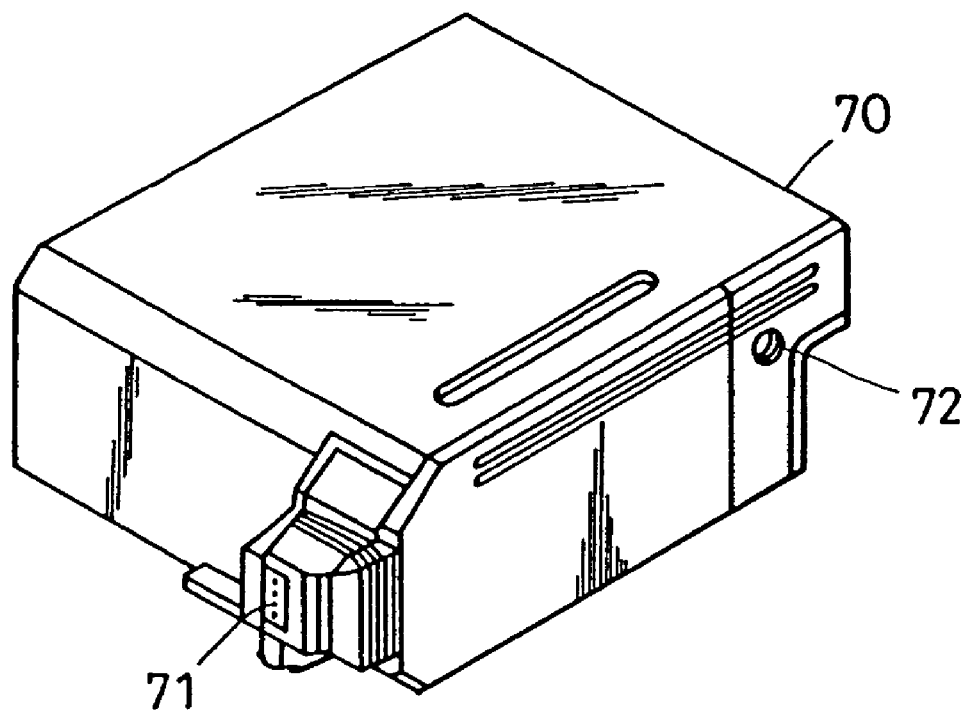
FIG. 6 is perspective view of a recording unit.

In FIG. 6, a recording unit 70 includes ink container sections in which the individual inks constituting the ink set of the present invention, for example, ink absorbents are contained, and the inks in the ink absorbents are ejected from a head section 71 provided with a plurality of orifices. An air communicating opening 72 connects the interior of the recording unit 70 with air. The recording unit 70 can be used instead of the recording head 65 shown in FIG. 4, and is detachably mounted on the carriage 66.

Figure 9:
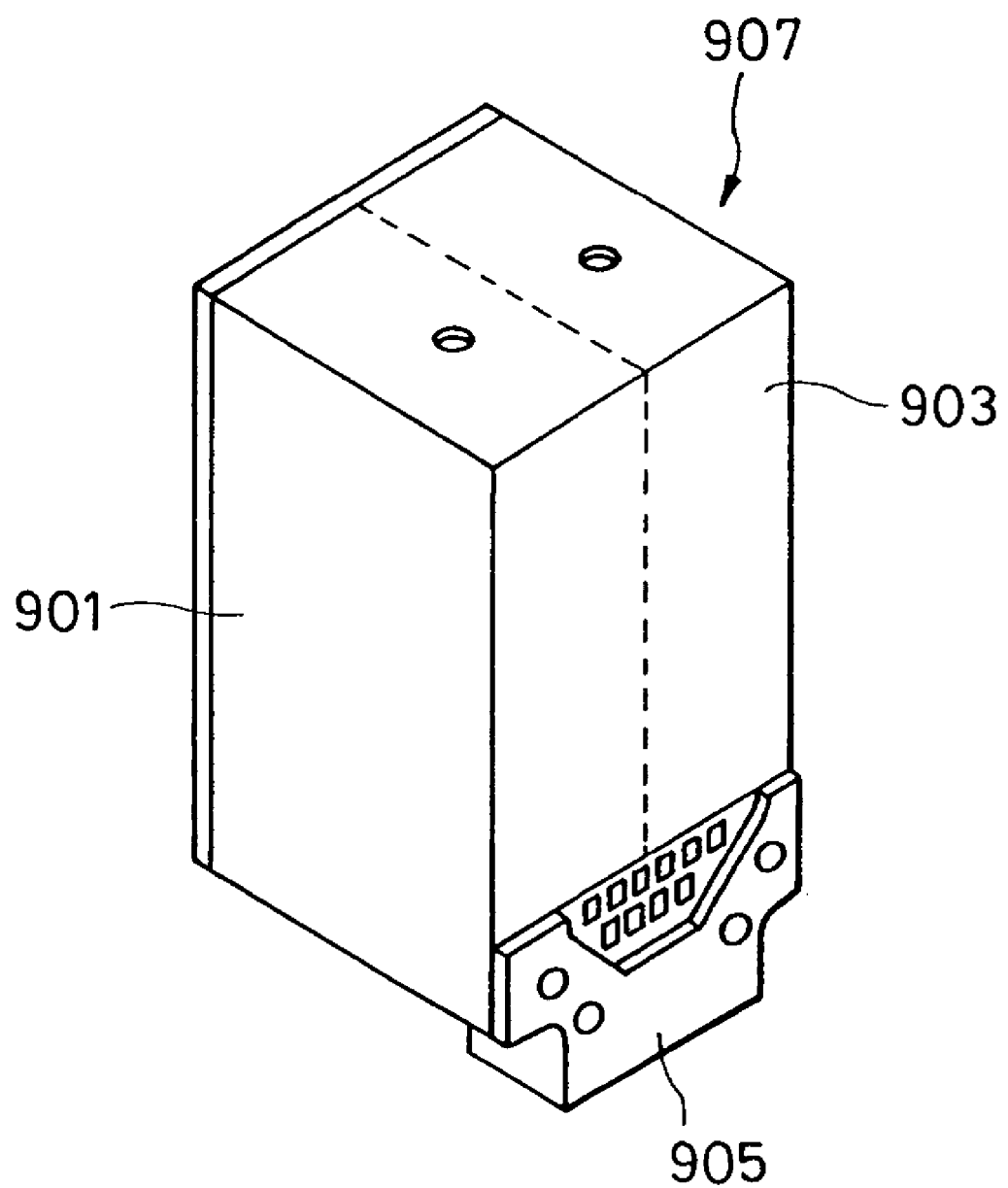
FIG. 9 is a schematic diagram showing a recording unit in an embodiment of the present invention.

Furthermore, a recording unit in another embodiment of the present invention will be described, in which the first ink and the second ink constituting the ink set of the present invention are contained in the respective ink container sections in an ink tank, and the ink tank and a recording head for ejecting the individual inks are integrally provided. Specifically, as shown in FIG. 9, a recording unit 907 includes a container section 901 for containing the first ink, a container section 903 for containing the second ink, and a recording head 905 in which ink passages are separately provided so that the individual inks are separately ejected.

Additionally, although the ink jet recording apparatus in which ink droplets are ejected by applying thermal energy to ink has been described above, the present invention is also applicable to an ink jet recording apparatus in which a piezoelectric element is used.

Next, other examples of the recording apparatus and the recording head which are preferably used in the present invention will be described.

Figure 10:
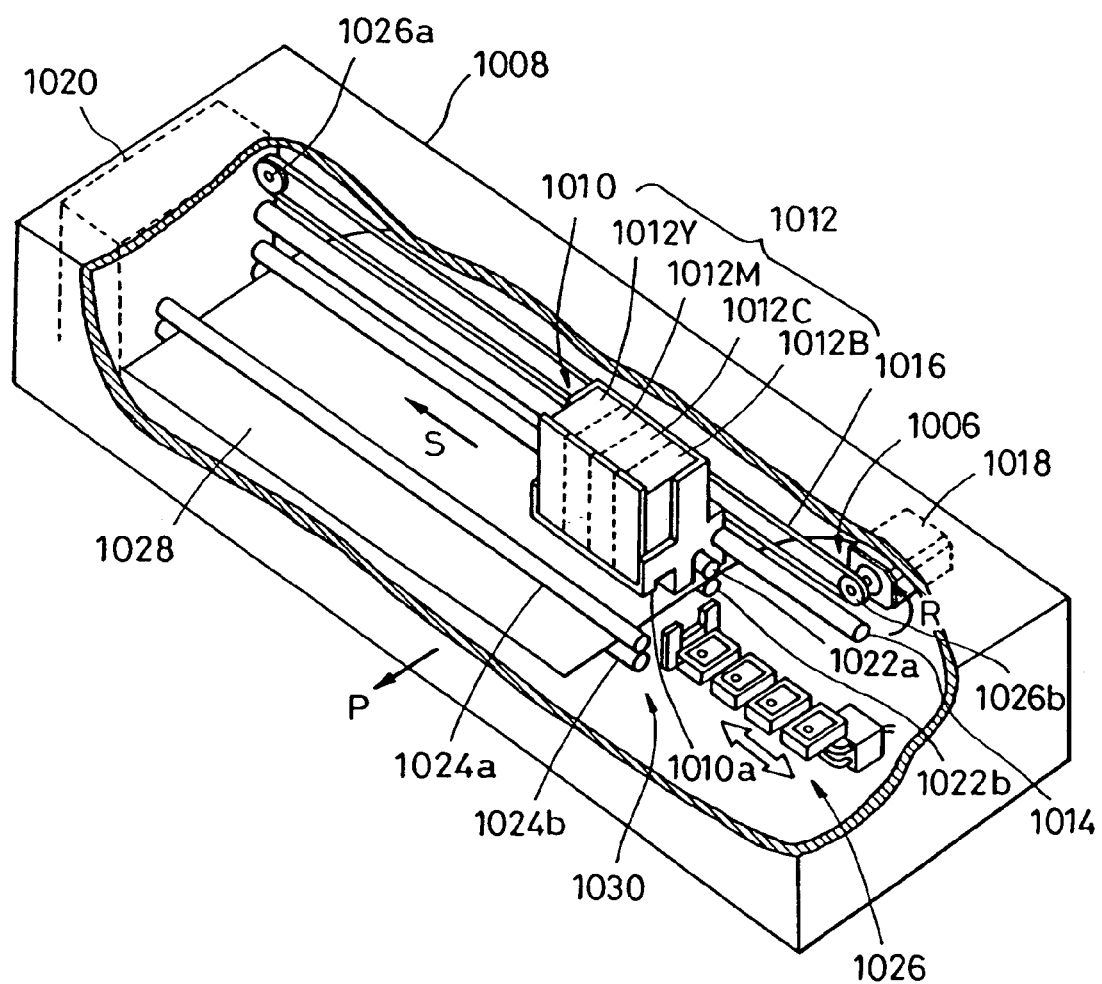
FIG. 10 is a schematic perspective view showing a key portion of an ink jet printer on which a liquid ejection head can be mounted.

FIG. 10 is a schematic perspective view showing a liquid ejection head, in which bubbles are completely surrounded by air during ejection, and a key portion of an ink jet printer as a liquid ejection apparatus using the liquid ejection head. The ink jet printer shown in FIG. 10 includes a casing 1008 containing a conveying device 1030 for intermittently conveying a recording sheet 1028 (recording medium), which is provided lengthwise, in the P direction shown in the drawing; a recording device 1010 which is reciprocated along a guide shaft 1014 in a direction substantially orthogonal to the conveying direction P of the recording sheet 1028 by the conveying device 1030; and a movement driving device 1006 as a driving means for reciprocating the recording device 1010.

The conveying device 1030 includes a pair of rollers 1022*a* and 1022*b*, a pair of rollers 1024*a* and 1024*b*, and a driving unit 1020 for driving the individual pairs of rollers. When the driving unit 1020 is operated, the recording sheet 1028 is intermittently conveyed in the P direction while being sandwiched between the rollers 1022*a* and 1022*b* and between the rollers 1024*a* and 1024*b*.

The movement driving device 1006 includes a belt 1016 placed around pulleys 1026*a* and 1026*b* rotatably disposed with a predetermined distance therebetween; and a motor 1018 for driving the belt 1016, which is placed substantially parallel to the rollers 1022*a* and 1022*b* and is connected with a carriage member 1010*a* of the recording device 1010, in the forward direction and the reverse direction.

When the motor 1018 is operated and the belt 1016 is rotated in the R direction shown in FIG. 10, the carriage member 1010*a* of the recording device 1010 is moved in the S direction by a predetermined length. When the motor 1018 is operated and the belt 1016 is rotated in a direction opposite to the R direction, the carriage member 1010*a* of the recording device 1010 is moved in a direction opposite to the S direction by a predetermined length. Furthermore, on one end of the movement driving device 1006, a recovery unit 1026 for performing ejection recovery treatment on the recording device 1010 is provided facing the ink ejection port array of the recording device 1010.

The recording device 1010 is provided with ink jet cartridges (hereinafter may be referred to as cartridges) 1012Y, 1012M, 1012C, and 1012B corresponding to yellow, magenta, cyan, and black, each detachably placed in the carriage member 1010a.

Figure 11:
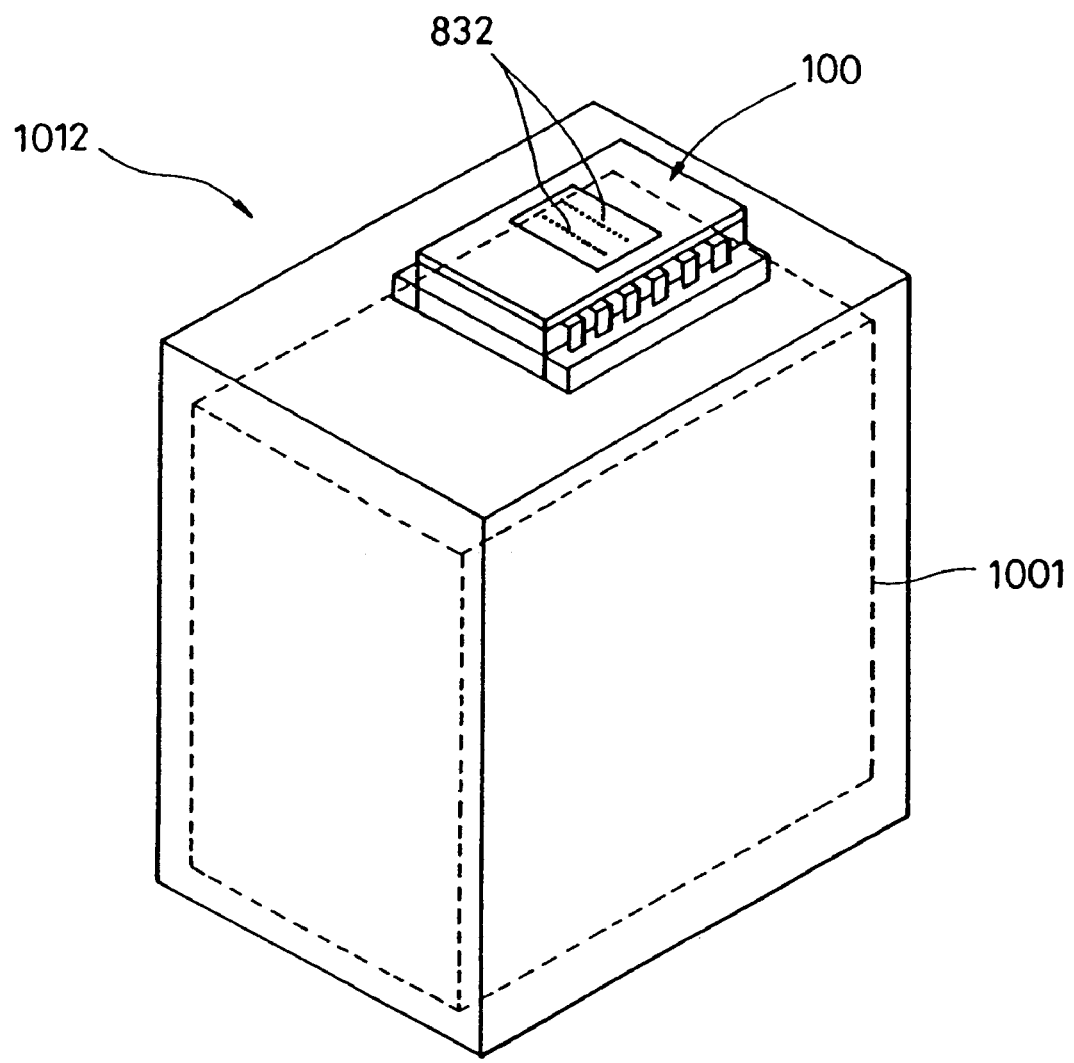
FIG. 11 is a schematic perspective view showing an ink jet cartridge provided with a liquid ejection head.

FIG. 11 shows an ink jet cartridge which is mountable on the ink jet recording apparatus described above in an embodiment of the present invention. A cartridge 1012 is of a serial type, and includes an ink jet recording head (liquid ejection head) 100 and a liquid tank 1001 for containing liquid, such as inks. The ink jet recording head 100 is provided with a plurality of ejection ports 832 for ejecting liquid, and liquid, such as ink, is guided to a common liquid chamber (refer to FIG. 12) of the liquid ejection head 100 via liquid supply passages (not shown in the drawing). In the cartridge 1012 shown in FIG. 11, the ink jet recording head 100 and the liquid tank 1001 are integrated, and liquid is supplied from the liquid tank 1001 as necessary. However, the liquid tank 1001 may be detachably connected to the liquid ejection head 100.

The liquid ejection head which is mountable on the ink jet printer as described above will be described in more detail.

Figure 12:
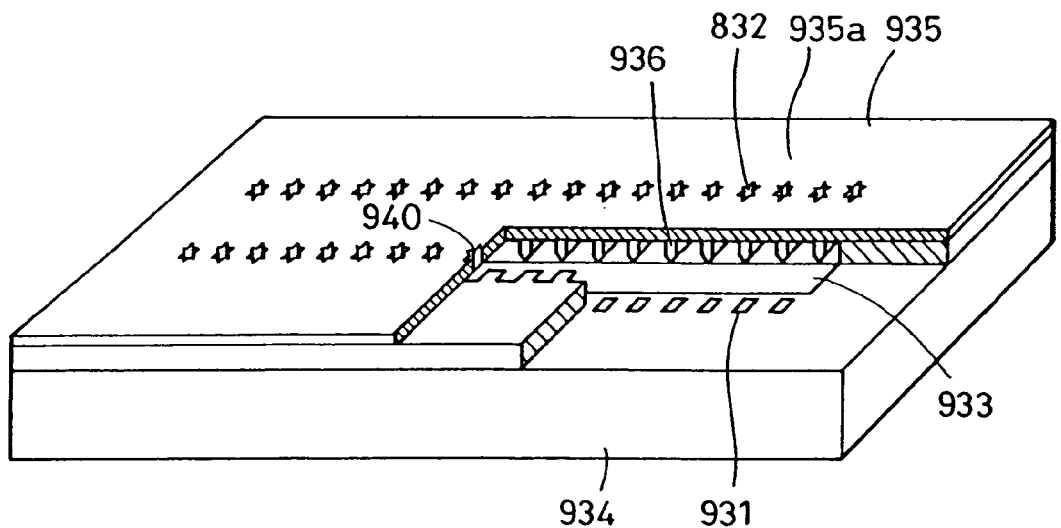
FIG. 12 is a schematic perspective view showing a key portion of a liquid ejection head.
Figure 13:
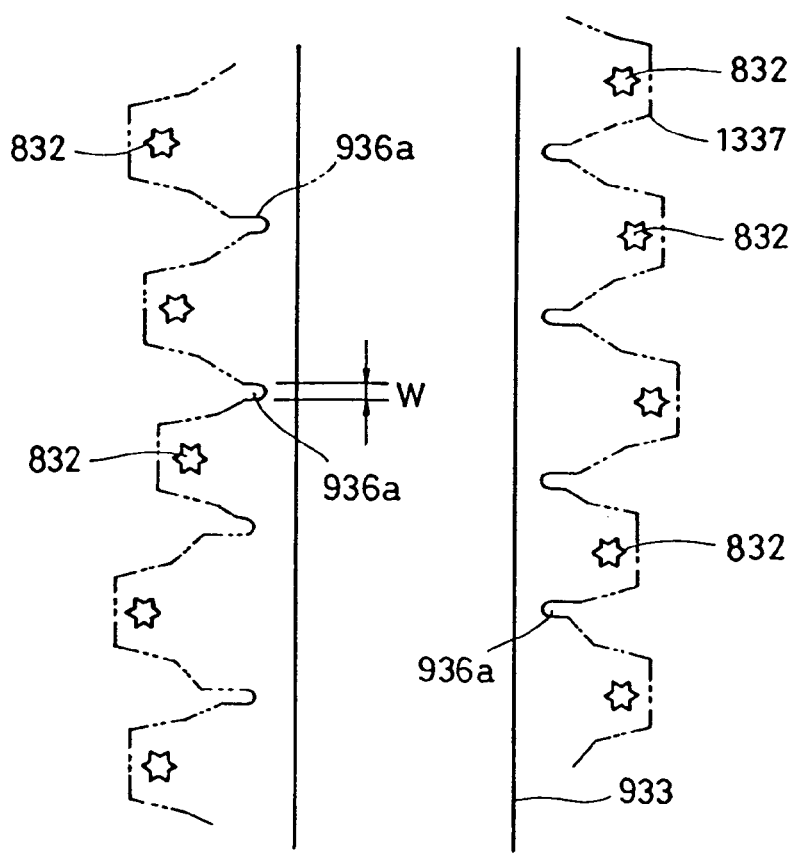
FIG. 13 is a conceptual diagram showing a portion of a liquid ejection head.
Figure 14:
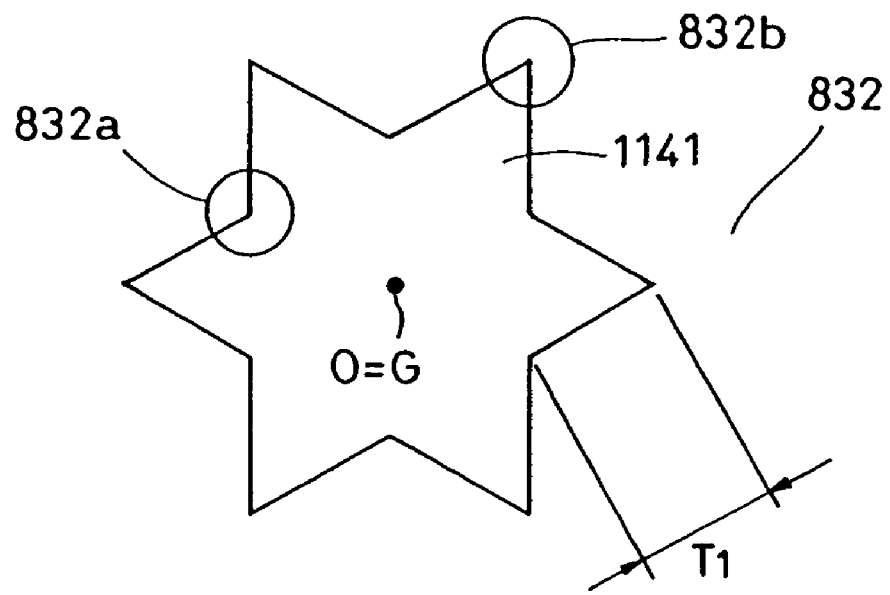
FIG. 14 is an enlarged view of an ejection port shown in FIG. 13.
Figure 15:
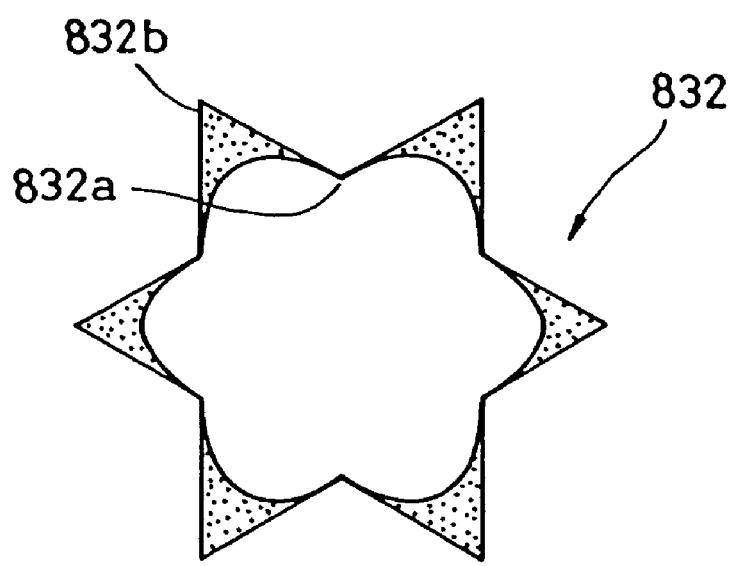
FIG. 15 is a schematic diagram showing the ink adhesion state at the ejection port shown in FIG. 14.

FIG. 12 is a schematic perspective view showing a key portion of a liquid ejection head in an embodiment of the present invention, and FIGS. 13 to 15 are schematic diagrams showing the shape of the ejection port section of the liquid ejection head shown in FIG. 12. Electrical wiring for driving electrothermal converting elements, etc. is omitted in the drawing.

As shown in FIG. 12, in the liquid ejection head, a substrate 934 composed of glass, ceramic, plastic, metal, or the like is used. The material for the substrate 934 is not particularly limited as long as it functions as a part of a liquid-passage-constituting member and as a support for ink ejection energy generation elements and a material layer for forming liquid passages and ejection ports. In this embodiment, a silicon substrate (wafer) is used as the substrate 934. The ejection ports may be formed by laser irradiation or by an aligner, such as a mirror projection aligner (MPA), using an orifice plate (ejection port plate) 935 composed of a photosensitive resin.

As shown in FIG. 12, the substrate 934 is provided with electrothermal converting elements (hereinafter may be referred to as heaters) 931 and an ink supply port 933, which is a through-hole shaped like a long groove, as a common liquid chamber. Heaters 931 acting as thermal energy generation means are arrayed in a zigzag line on each side of the ink supply port 933, for example, with a separation of 300 dpi between heaters. The substrate 934 is provided with ink passage walls 936 for forming ink passages. The ejection plate 935 provided with ejection ports 832 is disposed on the ink passage walls 936.

Although the ink passage walls 936 and the ejection plate 935 are separate members in the embodiment shown in FIG. 12, the ink passage walls 936 and the ejection plate 935 may be integrally formed simultaneously by spin coating or the like. In this embodiment, the upper surface 935a of the ejection plate 935 is subjected to water-repellent finishing.

Figure 16:
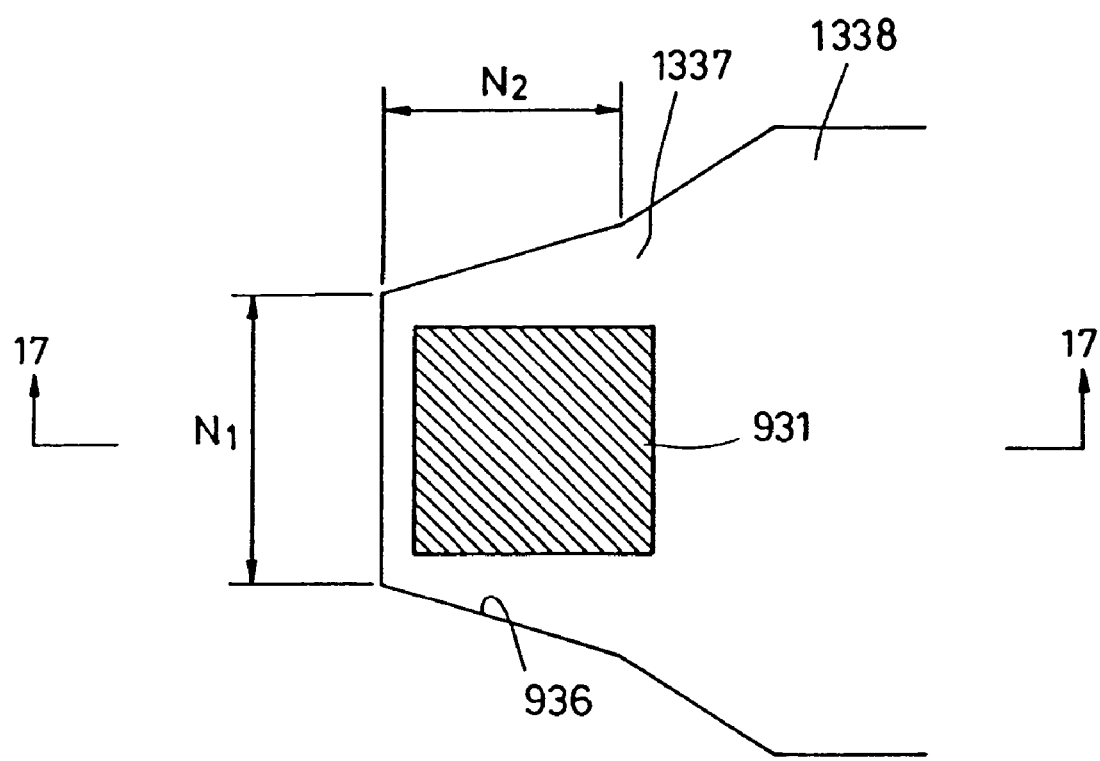
FIG. 16 is a schematic diagram showing a key portion of a liquid ejection head.

In this embodiment, a serial type head, which performs recording while scanning in the S direction shown in FIG. 10, is used and recording is performed, for example, at 1,200 dpi. The drive frequency is 10 kHz, and ejection is performed at minimum time intervals of 100 μs. As shown in FIG. 13, division walls 936a for isolating fluids ejected by adjacent nozzles have a width W of 14 μm. As shown in FIG. 16, liquid flow path 1338 has a bubble generation chamber 1337 formed by the ink passage wall 936 with a width $N_1$ of 33 μm and a length $N_2$ of 35 μm. The heater 931 has a size of 30 μm×30 μm, the heater resistance is 53 Ω, and the drive voltage is 10.3 V. The ink passage wall 936 and the division wall 936a have a height of 12 μm and the orifice plate 935 has a thickness of 11 μm.

FIG. 14 is a sectional view of an ejection port 832 in an ejection port section 940 shown in FIG. 12, taken in a direction orthogonal to the direction in which ink is ejected (the thickness direction of the orifice plate 935). As shown in FIG. 14, the cross section of the ejection port 832 is substantially star-shaped, and includes 6 convex sections 832a with obtuse angles, and 6 concave sections 832b with acute angles. The convex sections 832a and the concave sections 832b are arranged alternately. That is, 6 grooves 1141 are formed in the thickness direction of the orifice plate 935 (in the liquid ejection direction). The concave sections 832b, which are further from the center O of the ejection port, correspond to the distal portions of the grooves 1141, and the convex sections 832a, which are closer to the center O of the ejection port, correspond to the proximal portions of the grooves 1141, as shown in FIG. 14.

In this embodiment, for example, the ejection port section 940 has a cross section with a shape in which an equilateral triangle having sides of 27 μm is laid over a similar triangle and rotated by an angle of 60 degrees. The length $T_1$ shown in FIG. 14 is 8 μm. Each convex section 832a has an angle of 120 degrees, and each concave section 832b has an angle of 60 degrees. Therefore, the center O of the ejection port corresponds to the median point G of a polygon formed by linking together the centers of the adjacent grooves, i.e., centers (median points) of figures formed by linking the distal points of the grooves with the two proximal points adjacent to the distal point. The opening area of the ejection port 832 is 400 μm², and the opening area of one groove 1141 (the area of the figure formed by linking the distal point of the groove with the two proximal points adjacent to the distal point) is approximately 33 μm². FIG. 15 is a schematic diagram showing the state of the adhesion ink (C) at the ejection port shown in FIG. 14.

Figure 17:
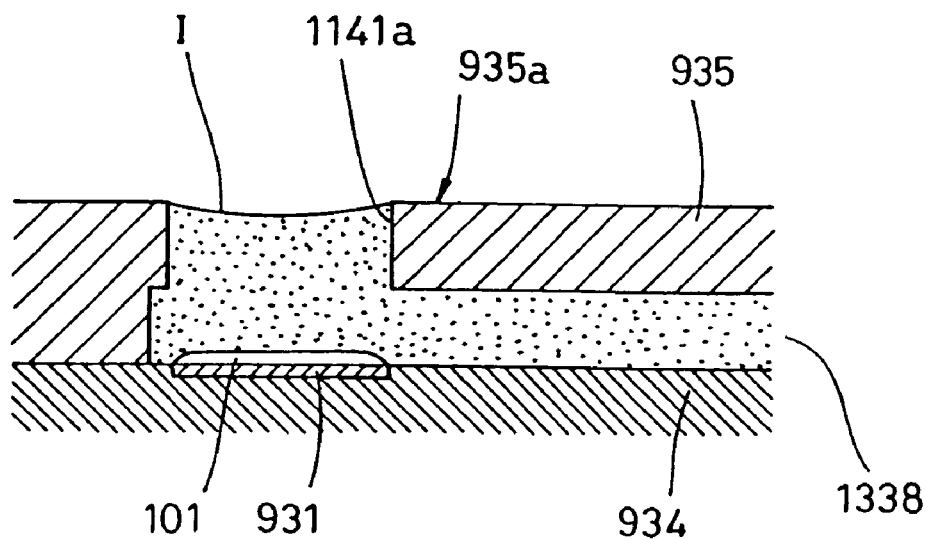
FIG. 17 is a sectional view taken along line 17—17 of FIG. 16, which schematically shows the liquid ejection operation of the liquid ejection head with time.

Next, the liquid ejection operation by the ink jet recording head having the structure described above will be described with reference to FIGS. 17 to 24. FIGS. 17 to 24 are sectional views of the bubble generation chamber 1337, taken along the line 17—17 of FIG. 16. In the drawings, the end of the ejection port section 940 in the thickness direction of the orifice plate 935 corresponds to the top part 1141a of the groove 1141. FIG. 17 shows a state in which a film-like bubble is generated in the liquid or ink, designated as I, on the heater 931, FIGS. 18 to 24 show the states at approximately 1 μs, 2 μs, 3 μs, 4 μs, 5 μs, 6 μs, and 7 μs after the state shown in FIG. 17, respectively. Additionally, the word "fall" or "sink" in the description below means movement toward the electrothermal converting element 931 regardless of the mounting direction of the head, and does not mean a fall in the direction of gravity.

Figure 18:
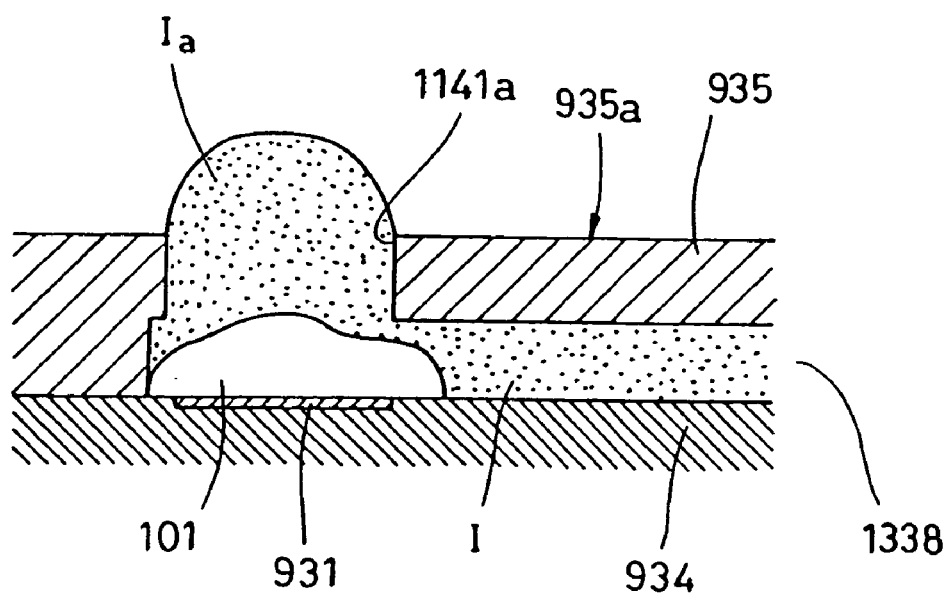
FIG. 18 is a sectional view taken along line 17—17 of FIG. 16, which schematically shows the liquid ejection operation of the liquid ejection head with time.
Figure 19:
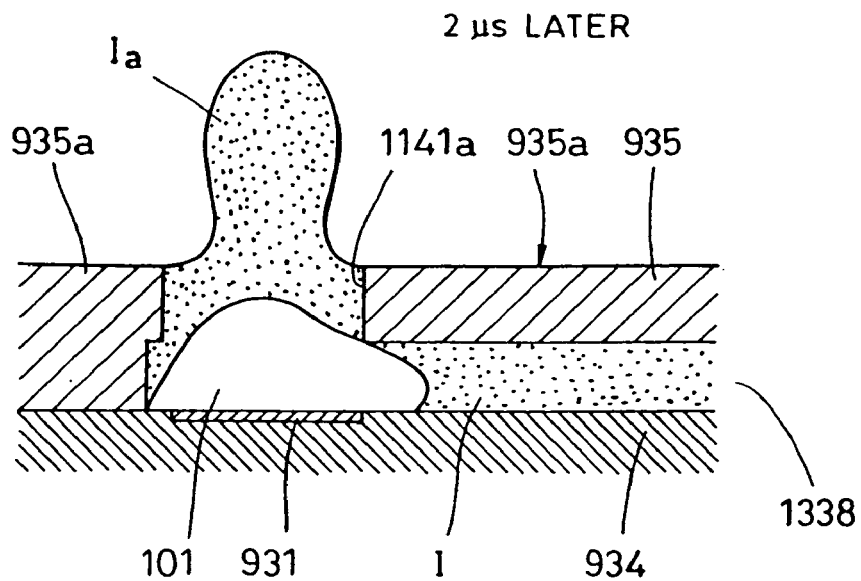
FIG. 19 is a sectional view taken along line 17—17 of FIG. 16, which schematically shows the liquid ejection operation of the liquid ejection head with time.

First, as shown in FIG. 17, as electric current is applied to the heater 931 based on a recording signal, etc., a bubble 101 is generated in a liquid passage 1338 above the heater 931, and at approximately 1 to 2 μs, the bubble 101 rapidly grows due to thermal expansion, as shown in FIGS. 18 and 19. When the bubble 101 is at its largest, the height of the bubble 101 exceeds the height of the ejection port surface 935a, and at this stage, the pressure of the bubble decreases from the atmospheric pressure by several to several tens percent.

Figure 20:
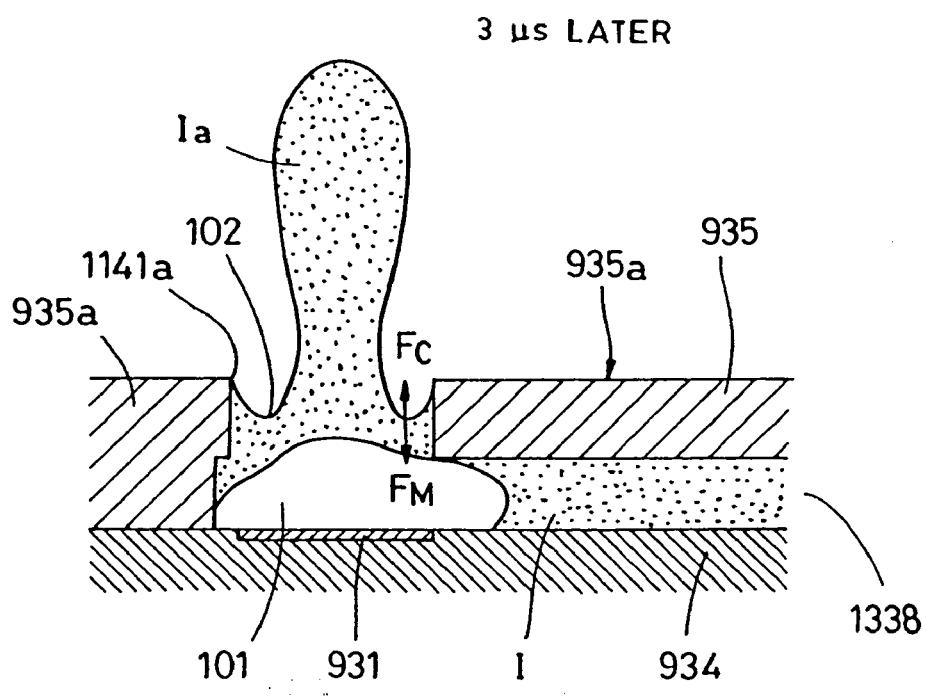
FIG. 20 is a sectional view taken along line 17—17 of FIG. 16, which schematically shows the liquid ejection operation of the liquid ejection head with time.

Next, approximately 2 μs after the generation of the bubble 101, the volume of the bubble 101 starts decreasing from the maximum, and almost simultaneously, generation of a meniscus 102 starts. As shown in FIG. 20, the meniscus 102 retreats, i.e., falls, toward the heater 931. In this embodiment, as described above, since the ejection port section has a plurality of grooves 1141, when the meniscus 102 retreats, capillary attraction acts on the groove 1141 in the $F_C$ direction opposite to the retreating direction $F_M$ of the meniscus 102. As a result, even if variations occur in the state of the bubble 101 for some reason, when the meniscus 102 retreats, the shapes of the meniscus 102 and a main liquid droplet (hereinafter may be referred to as liquid or ink) $I_a$ are corrected so as to be substantially symmetrical with respect to the center of the ejection port.

Figure 21:
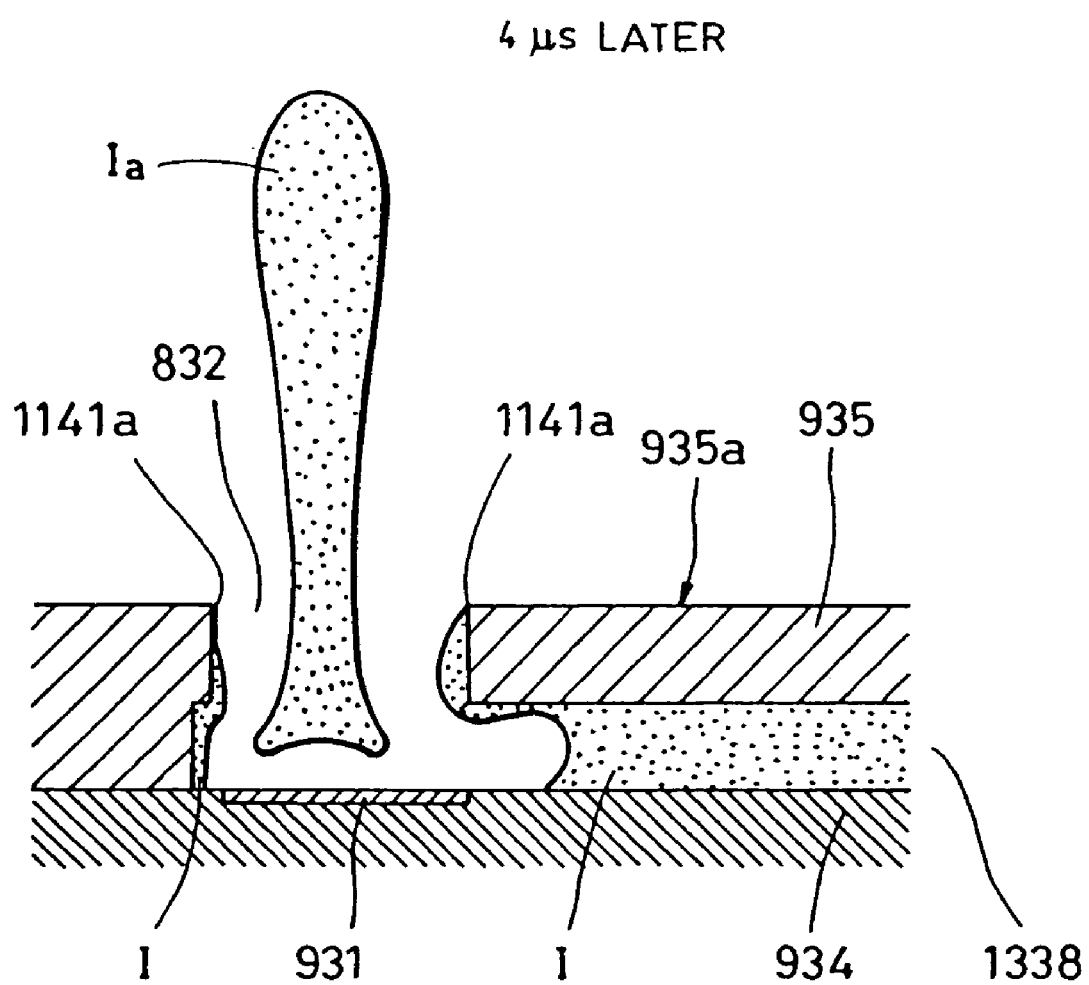
FIG. 21 is a sectional view taken along the line 17—17 of FIG. 16, which schematically shows the liquid ejection operation of the liquid ejection head with time.
Figure 22:
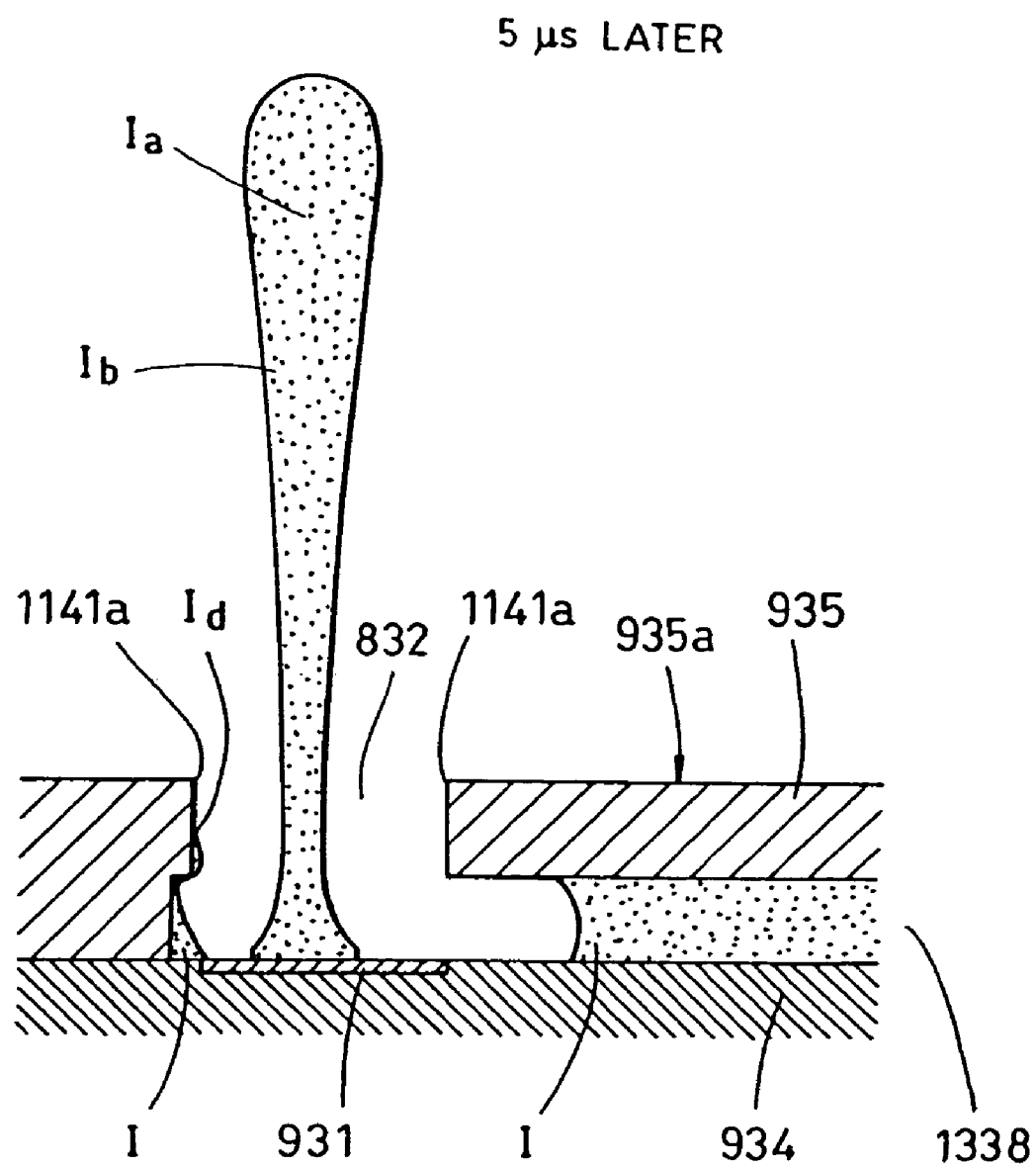
FIG. 22 is a sectional view taken along line 17—17 of FIG. 16, which schematically shows the liquid ejection operation of the liquid ejection head with time.
Figure 23:
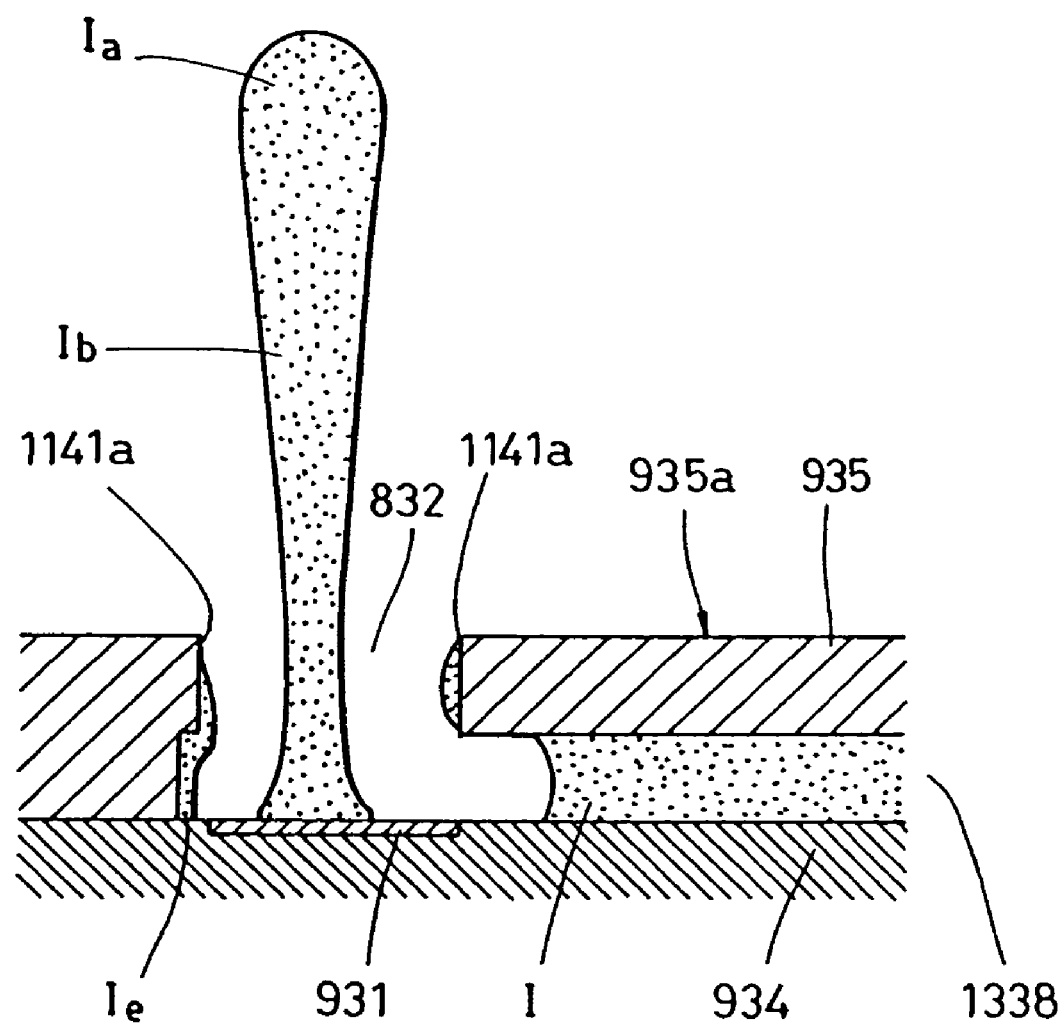
FIG. 23 is a sectional view taken along line 17—17 of FIG. 16, which schematically shows the liquid ejection operation of the liquid ejection head with time.

Since the falling rate of the meniscus 102 is higher than the contraction rate of the bubble 101, as shown in FIG. 21, approximately 4 μs after the generation of the bubble, the bubble 101 separates from the lower surface of the ejection port 832 and is completely surrounded by air. At this stage, liquid (ink) in the vicinity of the central axis of the ejection port 832 sinks toward the heater 931. This is due to the fact that the liquid (ink) $I_a$ which is pulled back toward the heater 931 by a negative pressure of the bubble 101 before the bubble is connected to air still maintains the velocity toward the heater 931 due to inertia. As shown in FIG. 22, the liquid (ink) sinks toward the heater 931, reaches the surface of the heater 931 approximately 5 μs after the generation of the bubble 101, and as shown in FIG. 23, the liquid spreads over the surface of the heater 931.

Figure 24:
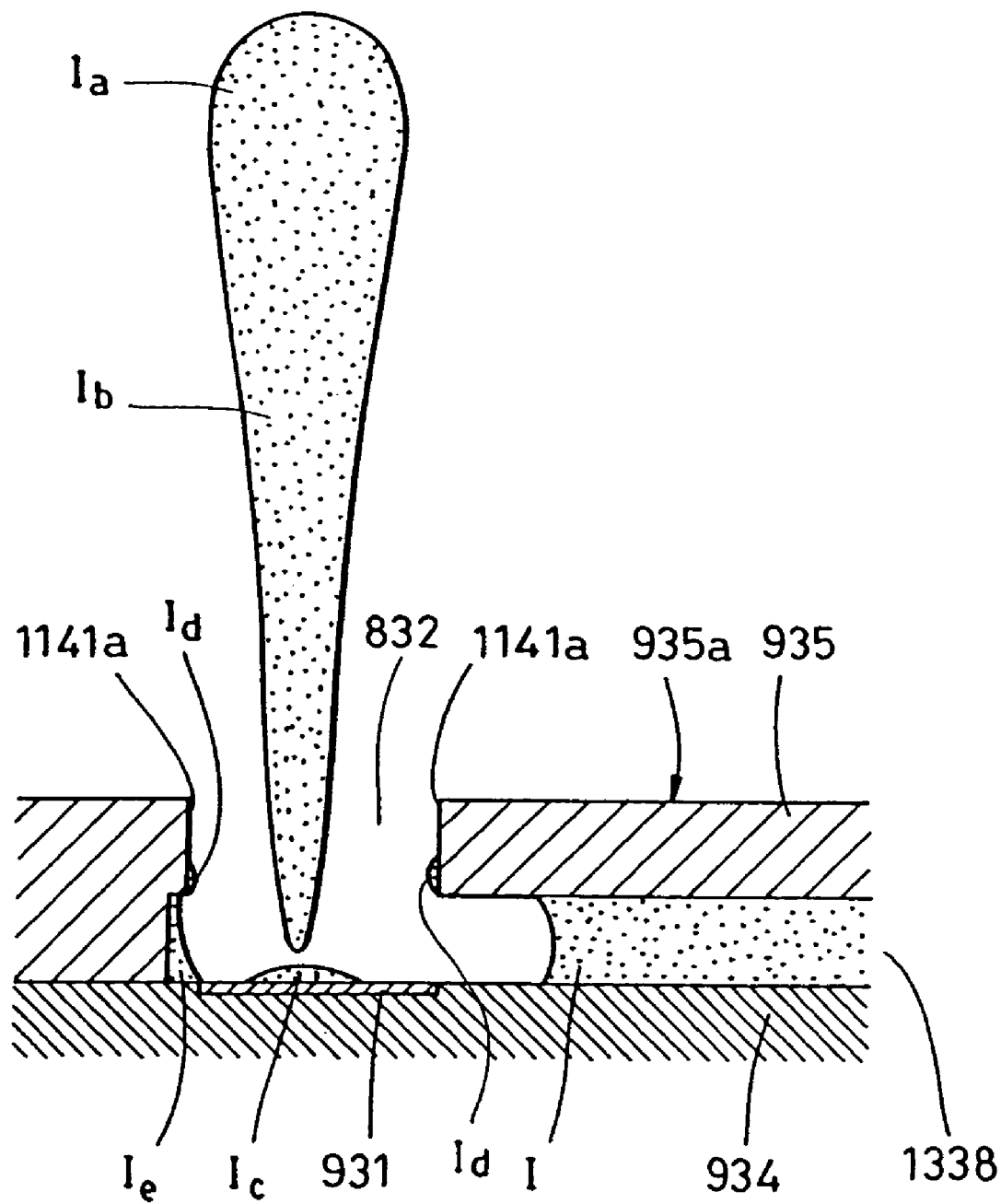
FIG. 24 is a sectional view taken along line 17—17 of FIG. 16, which schematically shows the liquid ejection operation of the liquid ejection head with time.

The lower portion of the liquid spreading over the surface of the heater 931 as described above has a vector directed along the surface of the heater 931, but loses a vector orthogonal to the surface of the heater 931, such as a vector directed normal to the surface of the heater 931, and stays on the surface of the heater 931, thereby pulling down the upper portion of the liquid, i.e., the liquid having a velocity vector directed in the ejection direction. Subsequently, liquid $I_b$ between the lower portion of the liquid spreading over the heater 931 and the upper portion of the liquid (main liquid droplet) $I_a$ becomes thinner, and as shown in FIG. 24, the liquid $I_b$ is cut in the center of the surface of the heater 931 approximately 7 μs after the generation of the bubble 101, and thus the main liquid droplet $I_a$ having a velocity vector directed in the ejection direction is separated from liquid $I_c$ spreading over the surface of the heater 931. As described above, the position of the separation is preferably in the liquid passage 1338, and more preferably, at the side of the electrothermal converting element (heater) 931 rather than at the side of the ejection port 832.

The main liquid droplet $I_a$ is ejected from the center of the ejection port 832 and hits a predetermined position on the surface of the recording medium, without a slant in the ejection direction. In a conventional liquid ejection head, the liquid $I_c$ spreading over the surface of the heater 931 is ejected as a satellite droplet after the main liquid droplet. However, in the present invention, the liquid $I_c$ spreading over the surface of the heater 931 remains on the surface of the heater 931 and is not ejected. In such a way, since it is possible to inhibit the ejection of the satellite droplet, spray which is likely to occur due to the ejection of the satellite droplet can be avoided, and thus it is possible to reliably prevent the surface of the recording medium from being smeared by this spray. Additionally, in FIGS. 22 to 24, symbol $I_d$ represents ink adhering to the groove (ink inside the groove) and symbol $I_e$ represents ink remaining in the liquid passage.

As described above, in the liquid ejection head in this embodiment, when the liquid is ejected after the bubble grows largest and the volume of the bubble decreases, the direction of the main liquid droplet can be stabilized by a plurality of grooves arranged around the center of the ejection port. Consequently, it is possible to provide a liquid ejection head which ejects the liquid without a slant so that the liquid hits the recording medium accurately. Since it is also possible to stably eject the liquid with respect to variations in bubbling at high drive frequencies, high speed, high definition printing is enabled.

In particular, since the liquid is ejected by completely surrounding the bubble by air for the first time at the stage in which the volume of the bubble decreases, it is possible to prevent spray from occurring when the liquid droplet is ejected. Consequently, it is possible to prevent the liquid droplet from adhering to the ejection port surface, which may cause sudden non-ejection. Examples of the recording head in which bubbles are completely surrounded by air during ejection, which can be favorably used in the present invention, include a so-called "edge shooter type" recording head, such as the one disclosed in Japanese Patent No. 2783647.

Next, the present invention will be described in more detail with reference to Examples and Comparative Examples. The contents of the ink ingredients in the Examples and Comparative Examples are shown in parts by weight unless otherwise indicated.

EXAMPLES 1 TO 7 AND COMPARATIVE
EXAMPLES 1 TO 6

The coloring materials and deionized water shown in Table 1 or 2 below were added to the ingredients shown in the ink composition 1 below so as to make the total 100 parts, followed by mixing. Using a 0.20 μm filter, pressure filtration was performed, and ink sets in Examples 1 to 7 and Comparative Examples 1 to 6, each containing two inks having different coloring material contents, were prepared.

| Ink Composition 1 | |
|---|---|
| Glycerol | 5.0 parts by weight |
| Urea | 5.0 parts by weight |
| Diethylene Glycol | 10.0 parts by weight |
| Acetylenol EH (manufactured by Kawaken Fine Chemicals Co., Ltd.) | 0.3 part by weight |
| Ethanol | 5.0 parts by weight |

TABLE 1

| | Example 1 | | Example 2 | | Example 3 | | Example 4 | |
|---|---|---|---|---|---|---|---|---|
| | C1 Light | C1 Deep | C2 Light | C2 Deep | Y1 Light | Y1 Deep | Y2 Light | Y2 Deep |
| C.I. Acid Blue 9 | 0.5 | | 0.3 | | | | | |
| C.I. Direct Blue 199 | 1.5 | 3.5 | | | | | | |
| C.I. Direct Blue 307 | | | 2.0 | 3.5 | | | | |
| C.I. Acid Yellow 23 | | | | | 0.5 | 1.0 | | |

TABLE 1-continued

|  | Example 1 | | Example 2 | | Example 3 | | Example 4 | |
| --- | --- | --- | --- | --- | --- | --- | --- | --- |
| C.I. Direct Yellow 132 |  |  |  |  |  |  | 1.2 | 2.5 |
| C.I. Direct Yellow 86 |  |  |  |  | 1.0 | 2.5 |  |  |
| C.I. Acid Red 289 |  |  |  |  |  |  |  |  |
| Deionized water | 73.2 | 70.7 | 72.7 | 70.9 | 73.7 | 71.7 | 73.5 | 71.2 |

|  | Example 5 | | Example 6 | | Example 7 | |
| --- | --- | --- | --- | --- | --- | --- |
|  | M1 Light | M1 Deep | M2 Light | M2 Deep | M3 Light | M3 Deep |
| Illustrative Compound I-3 |  | 2.2 |  |  |  |  |
| Illustrative Compound I-2 | 1.0 |  | 1.5 | 2.5 |  |  |
| Illustrative Compound I-7 |  |  |  |  | 1.8 | 3.0 |
| Illustrative Compound II-8 |  |  |  |  |  | 1.0 |
| Illustrative Compound II-12 |  | 1.6 |  |  |  |  |
| Illustrative Compound III-21 |  |  |  | 1.5 |  |  |
| C.I. Acid Red 289 |  |  |  |  |  | 0.1 |
| Deionized water | 73.7 | 70.9 | 73.2 | 70.7 | 72.9 | 70.6 | the individual inks, solid images were printed on two recording media, i.e., a PPC paper (manufactured by Canon Kabushiki Kaisha) and a glossy paper (PR-101 manufactured by Canon Kabushiki Kaisha). The printed materials thus obtained were air-dried for 24 hours, and using a xenon fade-meter Ci3000 (manufactured by Atlas Co.) provided with an ultraviolet cut filter, irradiation was performed for 100 hours at a vessel temperature of 35° C., a humidity of 60% RH, and an irradiation intensity of 60 klux. The solid images of the printed materials were measured with a Macbeth Densitometer RD-918 before and after the irradiation to find the residual rate of the reflection density, and the light-fastness was evaluated based on the following standards.

(1-a)

A: The residual rate of the reflection density of the image produced by the deep color ink was 80% or more.

B: The residual rate of the reflection density of the image produced by the deep color ink was 60% or more to less than 80%.

C: The residual rate of the reflection density of the image produced by the deep color ink was less than 60%.

(1-b)

A: The residual rate of the reflection density of the image produced by the light color ink was equal to or higher than the residual rate of the reflection density of the image produced by the deep color ink.

TABLE 2

|  | Comparative Example 1 | | Comparative Example 2 | | Comparative Example 3 | | Comparative Example 4 | | Comparative Example 5 | | Comparative Example 6 | |
| --- | --- | --- | --- | --- | --- | --- | --- | --- | --- | --- | --- | --- |
|  | C3 Light | C3 Deep | C4 Light | C4 Deep | Y3 Light | Y3 Deep | Y4 Light | Y4 Deep | M4 Light | M4 Deep | M5 Light | M5 Deep |
| C.I. Acid Blue 9 | 1.5 | 4.0 |  |  |  |  |  |  |  |  |  |  |
| C.I. Direct Blue 307 |  |  | 2.0 | 3.8 |  |  |  |  |  |  |  |  |
| C.I. Acid Yellow 23 |  |  |  |  | 1.0 | 1.0 |  |  |  |  |  |  |
| C.I. Direct Yellow 132 |  |  |  |  |  | 2.0 |  |  |  |  |  |  |
| C.I. Direct Yellow 86 |  |  |  |  |  |  | 1.0 | 3.5 |  |  |  |  |
| Illustrative Compound I-7 |  |  |  |  |  |  |  |  |  |  | 1.5 | 4.0 |
| Illustrative Compound II-8 |  |  |  |  |  |  |  |  | 0.9 | 3.8 |  |  |
| Deionized water | 73.2 | 70.7 | 72.7 | 70.9 | 73.7 | 71.7 | 73.7 | 71.2 | 73.8 | 70.9 | 73.2 | 70.7 |

Evaluation

With respect to each of the ink sets obtained in Examples 1 to 7 and Comparative Examples 1 to 6, printing was performed using an on-demand type ink jet printer having heat generation elements as energy sources for ejecting ink. The resulting printed images were evaluated with respect to (1) light-fastness and (2) color developing ability under the conditions described below. The results thereof are shown in Table 3.

(1) Light-Fastness

A deep color ink having a higher coloring material content and a light color ink having a lower coloring material content constituting the ink set in each of the Examples and Comparative Examples were fitted into the printer, and using B: The residual rate of the reflection density of the image produced by the light color ink was lower than the residual rate of the reflection density of the image produced by the deep color ink.

(2) Color Developing Ability

The deep color ink having a higher coloring material content in each ink set was fitted into the printer, and solid images were printed on two recording media, i.e., a PPC paper (manufactured by Canon Kabushiki Kaisha) and a glossy paper (PR-101 manufactured by Canon Kabushiki Kaisha). The printed materials thus obtained were air-dried for 24 hours, and the color developing ability thereof was visually checked based on the following standards.

AA: The color tone was significantly clear.
A: The color tone was clear.
B: The color tone was slightly dull.

TABLE 3

|  | Light-fastness | | (2) |
|---|---|---|---|
|  | (1-a) Deep Color Ink | (1-b) Light Color Ink | Color Developing Ability |
| Example 1 | A | A | A |
| Example 2 | A | A | A |
| Example 3 | A | A | A |
| Example 4 | A | A | A |
| Example 5 | A | A | A |
| Example 6 | A | A | A |
| Example 7 | A | A | AA |
| Comparative Example 1 | C | B | A |
| Comparative Example 2 | A | B | B |
| Comparative Example 3 | B | B | A |
| Comparative Example 4 | A | B | B |
| Comparative Example 5 | B | B | A |
| Comparative Example 6 | A | B | B |

Furthermore, using the inks in Examples 1 to 7, the printed materials used for the light-fastness evaluation were visually observed before and after the irradiation test. As a result, fading was not noticeable either in the portion printed with the first ink having a relatively high coloring material content or in the portion printed with the second ink having a relatively low coloring material content. In contrast, with respect to the printed materials used in Comparative Examples 1 to 6, since a change in color tone was partially observed due to the fading of the portion printed with the second ink, fading of the images after the test was noticeable. Consequently, it was found that in the present invention, the difference in deterioration rate due to light irradiation between the portion printed with the first ink and the portion printed with the second ink was relieved or overcome. It is obvious from the results described above that, in images produced with the first and second inks constituting the ink set of the present invention, a change over time in color balance due to a difference in deterioration rate can be inhibited.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A second aqueous ink for an ink jet recording apparatus used with a first aqueous ink, comprising a dye as a coloring material;
wherein the second aqueous ink and the first aqueous ink contain at least one common dye, the second aqueous ink has a same color tone as the first aqueous ink, the second aqueous ink has a lower dye content than the dye content of the first aqueous ink, and, a degree of fading of an image produced with the second aqueous ink is the same as or lower than a degree of fading of an image produced with the first aqueous ink.

2. A second aqueous ink according to claim 1, wherein the color tone is magenta.

3. A second aqueous ink for an ink jet recording apparatus used with a first aqueous ink, comprising a dye as a coloring material,
wherein the second aqueous ink and the first aqueous ink contain at least one common dye, the second aqueous ink has a same color tone as the first aqueous ink, the second aqueous ink has a lower dye content than the dye content of the first aqueous ink, and, a residual rate of reflection density of an image produced with the second aqueous ink is the same as or greater than a residual rate of reflection density of an image produced with the first aqueous ink.

4. A second aqueous ink according to claim 3, wherein the color tone is magenta.

5. A second aqueous ink according to claim 1, wherein each degree of the fading of the images produced with the first aqueous ink and the second aqueous ink is equal to or greater than 80% residual rate of reflection density of the image.

6. A second aqueous ink according to claim 5, wherein the residual rate of reflection density of the image is obtained by irradiation with a xenon lamp at 6,000 klux·hr.

7. A second aqueous ink according to claim 1, wherein the color tone is cyan.

8. A second aqueous ink according to claim 3, wherein each residual rate of the reflection density of the images produced with the first aqueous ink and the second aqueous ink is equal to or greater than 80%.

9. A second aqueous ink according to claim 8, wherein the condition includes irradiation with a xenon lamp at 6,000 klux·hr.

10. A second aqueous ink according to claim 3, wherein the color tone is cyan.

11. A second aqueous ink according to claim 2, wherein the second aqueous ink contains a dye represented by formula (I) as a sole coloring maternal:

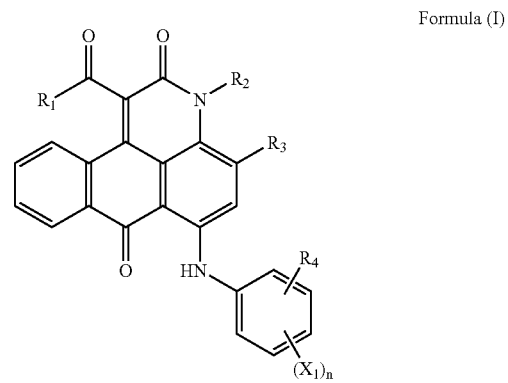

Formula (I)

wherein $R_1$ is a substituted or unsubstituted alkoxy group or a substituted or unsubstituted aryl group; each of $R_2$ and $R_4$ is independently a hydrogen atom or a substituted or unsubstituted alkyl group; $R_3$ is selected from the group consisting of a hydrogen atom, a substituted or unsubstituted alkyl group, a substituted or unsubstituted alkoxy group, a substituted or unsubstituted aryloxy group, and a halogen atom; $X_1$ is a carboxyl group or a salt thereof, or a sulfonic acid group or a salt thereof and n is 1 or 2.

12. A second aqueous ink according to claim 4, wherein the second aqueous ink contains a dye represented by formula (I) as a sole coloring material:

Formula (I)

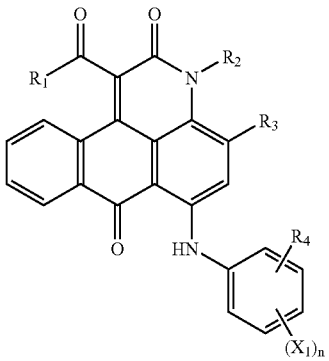

wherein $R_1$ is a substituted or unsubstituted alkoxy group or a substituted or unsubstituted aryl group; each of $R_2$ and $R_4$ is independently a hydrogen atom or a substituted or unsubstituted alkyl group; $R_3$ is selected from the group consisting of a hydrogen atom, a substituted or unsubstituted alkyl group, a substituted or unsubstituted alkoxy group, a substituted or unsubstituted aryloxy group, and a halogen atom; $X_1$ is a carboxyl group or a salt thereof, or a sulfonic acid group or a salt thereof; and n is 1 or 2.

13. An ink set comprising a first aqueous ink and a second aqueous ink having a same color tone, wherein the first aqueous ink and the second aqueous ink contain at least one common dye as a coloring material, the second aqueous ink has a lower coloring material content than the coloring material content of the first aqueous ink, and a degree of fading of an image produced with the second aqueous ink is the same as or lower than a degree of fading of an image produced with the first aqueous ink.

14. An ink set according to claim 13, wherein each degree of the fading of the image produced with the first aqueous ink and the second aqueous ink is equal to or greater than 80% residual rate of reflection density of the image.

15. An ink set according to claim 14, wherein the residual rate of reflection density of the image is obtained by irradiation with a xenon lamp at 6,000 klux·hr.

16. An ink set according to claim 13, wherein the color tone is magenta.

17. An ink set according to claim 16, wherein the second aqueous ink contains a dye represented by formula (I) as a sole coloring material:

Formula (I)

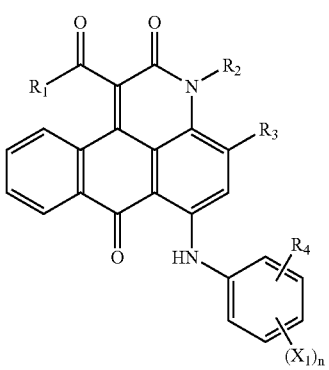

wherein R1 is a substituted or unsubstituted alkoxy group or a substituted or unsubstituted aryl group; each of $R_2$ and $R_4$ is independently a hydrogen atom or a substituted or unsubstituted alkyl group; $R_3$ is selected from the group consisting of a hydrogen atom, a substituted or unsubstituted alkyl group, a substituted or unsubstituted alkoxy group, a substituted or unsubstituted aryloxy group, and a halogen atom; $X_1$ is a carboxyl group or a salt thereof, or a sulfonic acid group or a salt thereof and n is 1 or 2.

18. An ink set comprising a first aqueous ink and a second aqueous ink having a same color tone, wherein the first aqueous ink and the second aqueous ink contain at least one common dye as a coloring material, the second aqueous ink has a lower coloring material content than the coloring material content of the first aqueous ink, and an image produced with the second aqueous ink when it is left under a condition that promotes fading has a residual rate of reflection density that is equal to or greater than that of an image produced with the first aqueous ink.

19. An ink set according to claim 18, wherein each degree of the fading of the image produced with the first aqueous ink and the second aqueous ink is equal to or greater than 80% residual rate of reflection density of the image.

20. An ink set according to claim 19, wherein the residual rate of reflection density of the image is obtained by irradiation with a xenon lamp at 6,000 klux·hr.

21. An ink set according to claim 18, wherein the color tone is magenta.

22. An ink set according to claim 21, wherein the second aqueous ink contains a dye represented by formula (I) as a sole coloring material:

Formula (I)

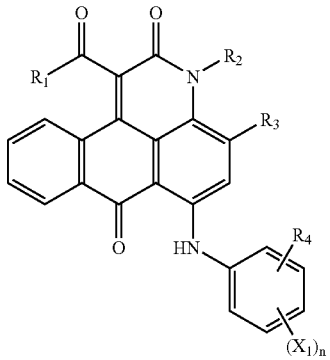

wherein $R_1$ is a substituted or unsubstituted alkoxy group or a substituted or unsubstituted aryl group; each of $R_2$ and $R_4$ is independently a hydrogen atom or a substituted or unsubstituted alkyl group; $R_3$ is selected from the group consisting of a hydrogen atom, a substituted or unsubstituted alkyl group, a substituted or unsubstituted alkoxy group, a substituted or unsubstituted aryloxy group, and a halogen atom; $X_1$ is a carboxyl group or a salt thereof, or a sulfonic acid group or a salt thereof; and n is 1 or 2.

23. An ink jet recording apparatus comprising:
ink storage portions storing a first aqueous ink and a second aqueous ink having a same color tone respectively, wherein the first aqueous ink and the second aqueous ink contain at least one common dye as a coloring material, the second aqueous ink has a lower coloring material content than the coloring material content of the first aqueous ink, and a degree of fading of an image produced with the second aqueous ink is the same as or lower than a degree of fading of an image produced with the first aqueous ink; and
a head portion for ejecting the inks.

24. An ink jet recording apparatus according to claim 23, wherein each degree of the fading of the image produced with the first aqueous ink and the second aqueous ink is equal to or greater than 80% as residual rate of reflection density of the image.

25. An ink jet recording apparatus according to claim 24, wherein the residual rate of reflection density of the image is obtained by irradiation with a xenon lamp at 6,000 klux·hr.

26. An ink jet recording apparatus according to claim 23, wherein the color tone is magenta.

27. An ink jet recording apparatus according to claim 26, wherein the second aqueous ink contains a dye represented by formula (I) as a sole coloring material:

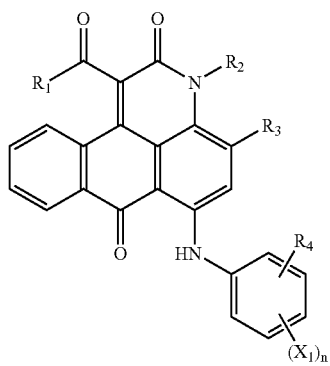

Formula (I)

wherein $R_1$ is a substituted or unsubstituted alkoxy group or a substituted or unsubstituted aryl group; each of $R_2$ and $R_4$ is independently a hydrogen atom or a substituted or unsubstituted alkyl group; $R_3$ is selected from the group consisting of a hydrogen atom, a substituted or unsubstituted alkyl group, a substituted or unsubstituted alkoxy group, a substituted or unsubstituted aryloxy group, and a halogen atom; $X_1$ is a carboxyl group or a salt thereof, or a sulfonic acid group or a salt thereof; and n is 1 or 2.

28. An ink jet recording apparatus comprising:

ink storage portions storing a first aqueous ink and a second aqueous ink having a same color tone respectively, wherein the first aqueous ink and the second aqueous ink contain at least one common dye as a coloring material, the second aqueous ink has a lower coloring material content than the coloring material content of the first aqueous ink, and an image produced with the second aqueous ink when it is left under a condition that promotes fading has a residual rate of reflection density that is equal to or greater than that of an image produced with the first aqueous ink; and a head portion for ejecting the inks.

29. An ink jet recording apparatus according to claim 28, wherein each degree of the fading of the image produced with the first aqueous ink and the second aqueous ink is equal to or greater than 80% residual rate of reflection density of the image.

30. An ink jet recording apparatus according to claim 29, wherein the residual rate of reflection density of the image is obtained by irradiation with a xenon lamp at 6,000 klux·hr.

31. An ink jet recording apparatus according to claim 28, wherein the color tone is magenta.

32. An ink jet recording apparatus according to claim 31, wherein the second aqueous ink contains a dye represented by formula (I) as a sole coloring material:

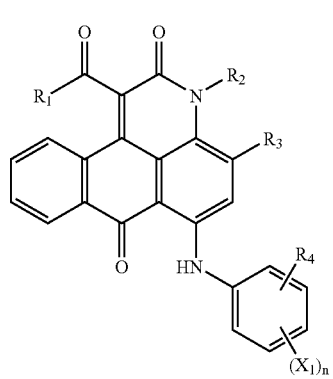

Formula (I)

wherein $R_1$ is a substituted or unsubstituted alkoxy group or a substituted or unsubstituted aryl group; each of $R_2$ and $R_4$ is independently a hydrogen atom or a substituted or unsubstituted alkyl group; $R_3$ is selected from the group consisting of a hydrogen atom, a substituted or unsubstituted alkyl group, a substituted or unsubstituted alkoxy group, a substituted or unsubstituted aryloxy group, and a halogen atom; $X_1$ is a carboxyl group or a salt thereof, or a sulfonic acid group or a salt thereof; and n is 1 or 2.

33. An ink jet recording method comprising the step of applying a first aqueous ink and a second aqueous ink having a same color tone to a recording medium, wherein the first aqueous ink and the second aqueous ink contain at least one common dye as a coloring material, the second aqueous ink has a lower coloring material content than the coloring material content of the first aqueous ink, and a degree of fading of an image produced with the second aqueous ink is the same as or lower than a degree of fading of an image produced with the first aqueous ink.

34. An ink jet recording method according to claim 33, wherein each degree of the fading of the image produced with the first aqueous ink and the second aqueous ink is equal to or greater than 80% residual rate of reflection density of the image.

35. An ink jet recording method according to claim 34, wherein the residual rate of reflection density of the image is obtained by irradiation with a xenon lamp at 6,000 klux·hr.

36. An ink jet recording method according to claim 33, wherein the color tone is magenta.

37. An ink jet recording method according to claim 36, wherein the second aqueous ink contains a dye represented by formula (I) as a sole coloring material:

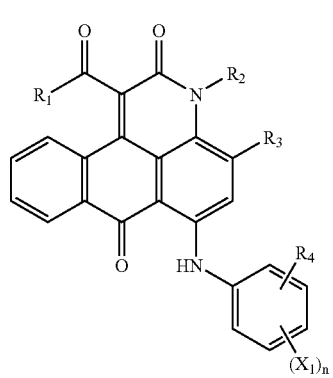

Formula (I)

wherein $R_1$ is a substituted or unsubstituted alkoxy group or a substituted or unsubstituted aryl group; each of $R_2$ and $R_4$ is independently a hydrogen atom or a substituted or unsubstituted alkyl group; $R_3$ is selected from the group consisting of a hydrogen atom, a substituted or unsubstituted alkyl group, a substituted or unsubstituted alkoxy group, a substituted or unsubstituted aryloxy group, and a halogen atom; $X_1$ is a carboxyl group or a salt thereof, or a sulfonic acid group or a salt thereof; and n is 1 or 2.

38. An ink jet recording method comprising the step of applying a first aqueous ink and a second aqueous ink having the same color tone to a recording medium, wherein the first aqueous ink and the second aqueous ink contain at least one common dye as a coloring material, the second aqueous ink has a lower coloring material content than the coloring material content of the first aqueous ink, and an image produced with the second aqueous ink when it is left under a condition that promotes fading has a residual rate of reflection density that is equal to or greater than that of an image produced with the first aqueous ink.

39. An ink jet recording method according to claim 38, wherein each degree of the fading of the image produced with the first aqueous ink and the second aqueous ink is equal to or greater than 80% residual rate of reflection density of the image.

40. An ink jet recording method according to claim 39, wherein the residual rate of reflection density of the image is obtained by irradiation with a xenon lamp at 6,000 klux·hr.

41. An ink jet recording method according to claim 38, wherein the color tone is magenta.

42. An ink jet recording method according to claim 41, wherein the second aqueous ink contains a dye represented by formula (I) as a sole coloring material:

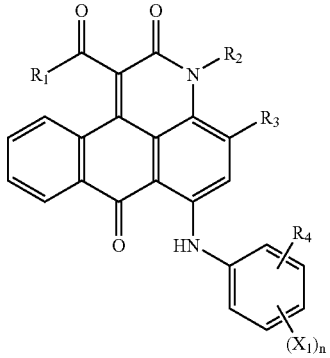

Formula (I)

wherein $R_1$ is a substituted or unsubstituted alkoxy group or a substituted or unsubstituted aryl group; each of $R_2$ and $R_4$ is independently a hydrogen atom or a substituted or unsubstituted alkyl group; $R_3$ is selected from the group consisting of a hydrogen atom, a substituted or unsubstituted alkyl group, a substituted or unsubstituted alkoxy group, a substituted or unsubstituted aryloxy group, and a halogen atom; $X_1$ is a carboxyl group or a salt thereof, or a sulfonic acid group or a salt thereof; and n is 1 or 2.

* * * * *

UNITED STATES PATENT AND TRADEMARK OFFICE
CERTIFICATE OF CORRECTION

PATENT NO. : 7,195,664 B2 Page 1 of 1
APPLICATION NO. : 10/682519
DATED : March 27, 2007
INVENTOR(S) : Kumiko Mafune et al.

It is certified that error appears in the above-identified patent and that said Letters Patent is hereby corrected as shown below:

ON THE TITLE PAGE
Item (56), under OTHER PUBLICATIONS, "XP-002176757 Database WPI Section Ch, week 199026 Derwent Publications Ltd. with resp ct to JP 02-127482, of May 16, 1990" should read --XP-002176757 Database WPI Section Ch, week 199026 Derwent Publications Ltd. with respect to JP 02-127482, of May 16, 1990--.

COLUMN 7
Line 10, "allow" should read --a low--.

COLUMN 11
Line 14, "naplithyl" should read --naphthyl--.

COLUMN 21
Line 11, "inserting-" should read --inserting--.

COLUMN 30
Line 13, "and," should read --and--.

Signed and Sealed this

Eighteenth Day of March, 2008

JON W. DUDAS
*Director of the United States Patent and Trademark Office*